(12) United States Patent
Behravan et al.

(10) Patent No.: US 9,397,807 B2
(45) Date of Patent: Jul. 19, 2016

(54) UE, NETWORK NODE AND METHODS OF ASSISTING MEASUREMENTS IN MIXED SIGNAL CONFIGURATION

(71) Applicant: Telefonaktiebolaget L M Ericsson (publ), Stockholm (SE)

(72) Inventors: Ali Behravan, Stockholm (SE); Muhammad Kazmi, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 217 days.

(21) Appl. No.: 14/353,203

(22) PCT Filed: Mar. 27, 2014

(86) PCT No.: PCT/SE2014/050367
§ 371 (c)(1),
(2) Date: Apr. 21, 2014

(87) PCT Pub. No.: WO2014/163554
PCT Pub. Date: Oct. 9, 2014

(65) Prior Publication Data
US 2015/0131544 A1   May 14, 2015

Related U.S. Application Data

(60) Provisional application No. 61/808,644, filed on Apr. 5, 2013.

(51) Int. Cl.
*H04L 12/26* (2006.01)
*H04L 5/00* (2006.01)
*H04B 7/02* (2006.01)

(52) U.S. Cl.
CPC .............. *H04L 5/0048* (2013.01); *H04L 5/001* (2013.01); *H04L 5/0094* (2013.01); *H04B 7/022* (2013.01); *H04L 5/0035* (2013.01)

(58) Field of Classification Search
CPC ............................. H04W 24/10; H04W 56/00
USPC ........................................... 370/252; 375/340
See application file for complete search history.

(56) References Cited

U.S. PATENT DOCUMENTS

2011/0319069 A1   12/2011   Li
2012/0046030 A1   2/2012    Siomina et al.
(Continued)

FOREIGN PATENT DOCUMENTS

EP   2 564 611      1/2013
EP   2 564 611 B1   2/2015
(Continued)

OTHER PUBLICATIONS

International Search Report for International Application No. PCT/SE2014/050367 mailed Jul. 25, 2014, 5 pages.
(Continued)

*Primary Examiner* — Wanda Z Russell
(74) *Attorney, Agent, or Firm* — Myers Bigel & Sibley, P.A.

(57) ABSTRACT

A method in a UE for adapting a radio procedure is provided. The UE obtains information about signal configurations indicating:
  whether or not a DL RS, transmitted in cells on a first carrier frequency of a first carrier use the same one of a first and a second signal configuration, or
  whether or not the DL RS transmitted in the cells on the first carrier frequency use the same one of the first and the second signal configuration as that used for DL RS transmitted in a serving cell of the UE on the first carrier frequency.

The first signal configuration includes the DL RS not being transmitted in every subframe. The second signal configuration includes the DL RS being transmitted in every subframe and also in every resource block over an entire channel bandwidth of a neighbor cell. The UE adapts a radio procedure based on the information.

44 Claims, 9 Drawing Sheets

---

501. Send message to network node about capability of UE, of performing radio measurements on cells on carrier comprising mixture of cells operating using 1st and 2nd signal configuration.

502. Obtain information about signal configurations.

503. Adapt radio procedure based on obtained information.

(56) References Cited

U.S. PATENT DOCUMENTS

| | | | |
|---|---|---|---|
| 2012/0076039 A1* | 3/2012 | Kwon | H04B 7/0634 370/252 |
| 2013/0176884 A1* | 7/2013 | Chang | H04W 24/10 370/252 |
| 2013/0176952 A1* | 7/2013 | Shin | H04L 5/001 370/329 |
| 2013/0182799 A1* | 7/2013 | Geirhofer | H04W 56/00 375/340 |
| 2014/0044109 A1* | 2/2014 | Nogami | H04W 24/10 370/336 |
| 2014/0119207 A1* | 5/2014 | Yamada | H04L 5/00 370/252 |
| 2015/0029874 A1* | 1/2015 | Davydov | H04W 28/24 370/252 |
| 2015/0229453 A1* | 8/2015 | Dai | H04L 5/0051 370/329 |
| 2015/0249973 A1* | 9/2015 | Park | H04L 5/001 370/329 |

FOREIGN PATENT DOCUMENTS

| | | |
|---|---|---|
| WO | WO 2011/162660 A1 | 12/2011 |
| WO | WO 2013/025547 A2 | 2/2013 |
| WO | WO 2013/192482 A1 | 12/2013 |

OTHER PUBLICATIONS

Written Opinion of the International Searching Authority for International Application No. PCT/SE2014/050367 mailed Jul. 25, 2014, 10 pages.

3GPP TS 36.211 V11.5.0 (Dec. 2013) $3^{rd}$ Generation Partnership Project; Technical Specification Group Radio Access Network; Evolved Universal Terrestrial Radio Access (E-UTRA); Physical channels and modulation (Release 11); 650 Route des Lucioles, Sophia Antipolis, Valbonne, France; 120 pages.

Communication with Supplementary European Search Report, EP 14778286.6, Mar. 18, 2016.

* cited by examiner

UE, NETWORK NODE AND METHODS OF ASSISTING MEASUREMENTS IN MIXED SIGNAL CONFIGURATION

CROSS REFERENCE TO RELATED APPLICATION

This application is a 35 U.S.C. §371 national stage application of PCT International Application No. PCT/SE2014/050367, filed in the English language on 27 Mar. 2014, which itself claims the benefit of U.S. provisional Patent Application No. 61/808,644, filed 5 Apr. 2013, the disclosures and contents of both of which are incorporated by reference herein in their entirety.

TECHNICAL FIELD

Embodiments herein relate to a User Equipment (UE), a network node and methods therein. In particular, it relates to adapting a radio procedure and to assisting a UE in adapting a radio procedure.

BACKGROUND

Communication devices such as terminals are also known as e.g. User Equipments (UE), mobile terminals, wireless terminals and/or mobile stations. Terminals are enabled to communicate wirelessly in a cellular communications network or wireless communication system, sometimes also referred to as a cellular radio system or cellular networks. The communication may be performed e.g. between two terminals, between a terminal and a regular telephone and/or between a terminal and a server via a Radio Access Network (RAN) and possibly one or more core networks, comprised within the cellular communications network.

Terminals may further be referred to as mobile telephones, cellular telephones, laptops, or surf plates with wireless capability, just to mention some further examples. The terminals in the present context may be, for example, portable, pocket-storable, hand-held, computer-comprised, or vehicle-mounted mobile devices, enabled to communicate voice and/or data, via the RAN, with another entity, such as another terminal or a server.

The cellular communications network covers a geographical area which is divided into cell areas, wherein each cell area being served by an access node such as a base station, e.g. a Radio Base Station (RBS), which sometimes may be referred to as e.g. "eNB", "eNodeB", "NodeB", "B node", or BTS (Base Transceiver Station), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the terminals within range of the base stations. In the context of this disclosure, the expression Downlink (DL) is used for the transmission path from the base station to the mobile station. The expression Uplink (UL) is used for the transmission path in the opposite direction i.e. from the mobile station to the base station.

In 3rd Generation Partnership Project (3GPP) Long Term Evolution (LTE), base stations, which may be referred to as eNodeBs or even eNBs, may be directly connected to one or more core networks.

3GPP LTE radio access standard has been written in order to support high bitrates and low latency both for uplink and downlink traffic. All data transmission is in LTE controlled by the radio base station.

Multi-Carrier or Carrier Aggregation Concept

To enhance peak-rates within a technology, multi-carrier or carrier aggregation solutions are known. A radio network node and a UE transmit and/or receive signals over a carrier, also known as carrier frequency. For example, it is possible to use multiple 5 MHz carriers in High Speed Packet Access (HSPA) to enhance the peak-rate within a HSPA network. Similarly in LTE for example multiple 20 MHz carriers or even smaller carriers (e.g. 5 MHz) may be aggregated in the UL and/or on DL. Each carrier in multi-carrier or carrier aggregation system is generally termed as a Component Carrier (CC) or sometimes is also referred to a cell. In simple words the CC means an individual carrier in a multi-carrier system. The term Carrier Aggregation (CA) is also called, e.g. interchangeably called, multi-carrier system, multi-cell operation, multi-carrier operation, multi-carrier transmission and/or reception. This means the CA is used for transmission of signaling and data in the uplink and downlink directions. One of the CCs is the Primary Component Carrier (PCC) or simply primary carrier or even anchor carrier. The remaining ones are called Secondary Component Carrier (SCC) or simply secondary carriers or even supplementary carriers. Generally the primary or anchor CC carries the essential UE specific signaling. The primary CC exists in both uplink and direction CA. The network may assign different primary carriers to different UEs operating in the same sector or cell.

Therefore the UE has more than one serving cell in downlink and/or in the uplink: one primary serving cell and one or more secondary serving cells operating on the PCC and SCC respectively. The serving cell is interchangeably called as Primary Cell (PCell) or Primary Serving Cell (PSC). Similarly the secondary serving cell is interchangeably called as Secondary Cell (SCell) or secondary serving cell (SSC). Regardless of the terminology, the PCell and SCell(s) enable the UE to receive and/or transmit data. More specifically the PCell and SCell exist in DL and UL for the reception and transmission of data by the UE. The remaining non-serving cells on the PCC and SCC are called neighbor cells.

The CCs belonging to the CA may belong to the same frequency band, also known as intra-band CA, or to different frequency band, inter-band CA, or any combination thereof. E.g. 2 CCs in band A and 1 CC in band B. The inter-band CA comprising carriers distributed over two bands is also called as Dual-Band-Dual-Carrier-(DB-DC-) High Speed Downlink Packet Access (HSDPA) in HSPA or inter-band CA in LTE. Furthermore the CCs in intra-band CA may be adjacent or non-adjacent in frequency domain, also known as intra-band non-adjacent CA. A hybrid CA comprising of intra-band adjacent, intra-band non-adjacent and inter-band is also possible. Using carrier aggregation between carriers of different technologies is also referred to as "multi-Radio Access Technology (RAT) carrier aggregation" or "multi-RAT-multi-carrier system" or simply "inter-RAT carrier aggregation". For example, the carriers from WCDMA and LTE may be aggregated. Another example is the aggregation of LTE and CDMA2000 carriers. For the sake of clarity the carrier aggregation within the same technology as described can be regarded as 'intra-RAT' or simply 'single RAT' carrier aggregation.

The CCs in CA may or may not be co-located in the same site or base station or radio network node, e.g. relay, mobile relay etc. For instance the CCs may originate, i.e. transmitted and/or received at different locations, e.g. from non-located BS or from BS and RRH or RRU. The well-known examples of combined CA and multi-point communication are DAS, RRH, RRU, CoMP, multi-point transmission/reception etc.

New Carrier Type

In NCT mandatory transmissions are minimized to achieve improved user and system throughput, improved energy efficiency, and improved spectrum access and flexibility. In the following some of the main design features of NCT are listed.

Enhanced Synchronization Signal

In NCT, there are fewer resources used for common reference signals within the cell. So instead of transmission of Common Reference Signals (CRS), which is transmitted on two ports, and every subframe, Extended Synchronization Signal (ESS) which is transmitted only on port 0 and every 5th subframes is used. A port is also known as an antenna port, which is an entity used for transmitting radio signals. The reduction in overhead achieved by using the ESS is shown in FIG. 1. FIG. 1 depicts Legacy Carrier Type (LCT) with CRS, and NCT with ESS signal. In FIG. 1, the dotted lines represent the reference signals transmitted. In NCT the reference signal may also be sent over shorter Bandwidth (BW) i.e. over fewer Resource Blocks (RB)s than the cell BW. Furthermore the synchronization signal configuration in a cell operating using NCT may also be different compared to that in LCT i.e. location of PSS and/or SSS signals may be different.

ePDCCH

In LTE, control information, paging and random access responses are transmitted using the Physical Downlink Control Channel (PDCCH). The PDCCH is transmitted in the first few symbols of a subframe of duration 1 ms and over the entire BW. In each subframe the PDCCH may occupy one to three Orthogonal Frequency Division Multiplexing (OFDM) symbols out of fourteen symbols (Four symbols may be used when the carrier bandwidth is only 1.4 MHz). In LTE TS 36.211, Release 11, an additional control mechanism, the enhanced PDCCH (ePDCCH), has been defined for transmitting control information that is specific to a UE, also referred to as UE-specific information. In NCT ePDDCH is used which is transmitted across symbols and over a limited BW. Information that is common to multiple UEs, also referred to as common information, is still transmitted using the legacy PDCCH.

FIG. 2 illustrates LCT with CRS, and NCT with ESS signal. CRS is marked with downward diagonal lines, and ESS is marked with upward diagonal lines.

UE-Specific Carrier Bandwidth

In LTE TS 36.211 Release-11, each UE is informed of the carrier BW and all UEs must support the complete system BW. This is partly because the PDCCH spans over the entire carrier BW. As stated earlier, one of the design goals in LTE Release 12 for the NCT is to enable UEs that support a system BW that is lower than the NCT BW. In order to do this, a UE should be able to perform all functions including initial system access on a subset of the PRBs being transmitted from the carrier. Since, the new carrier type does not use the PDCCH and only uses the ePDCCH which can be deployed in a subset of the total available PRBs, this is possible on the new carrier.

Measurements

Radio Resource Management (RRM) Measurement

Several radio related measurements are used by the UE or the radio network node to establish and keep the connection, as well as ensuring the quality of a radio link.

The measurements are used in Radio Resource Control (RRC) idle state operations such as cell selection, cell reselection e.g. between Evolved Universal Terrestrial Radio Access Networks (E-UTRANs), between different RATs, and to non-3GPP RATs, and Minimization of Drive Test (MDT), and also in RRC connected state operations such as for cell change e.g. handover between E-UTRANs, handover between different RATs, and handover to non-3GPP RATs.

The UE has to first detect a cell and therefore cell identification e.g. acquisition of a Physical Cell Identity (PCI), is also a signal measurement. The UE may also have to acquire the Cell Global ID (CGI) of a UE.

In HSPA and LTE the serving cell can request the UE to acquire the system information of the target cell. More specifically the SI is read by the UE to acquire the CGI, which uniquely identifies a cell, of the target cell. The UE may also be requested to acquire other information such as Closed Subscriber Group (CSG) indicator, CSG proximity detection from the target cell.

The UE reads the SI of the target cell e.g. intra-, inter-frequency or inter-RAT cell, upon receiving an explicit request from the serving network node via RRC signaling e.g. from a Radio Network Controller (RNC) in HSPA or eNode B in case of LTE. The acquired SI is then reported to the serving cell. The signaling messages are defined in the relevant HSPA and LTE specifications.

In order to acquire the System Information (SI) which contains the CGI of the target cell, the UE has to read at least part of the SI including master information block (MIB) and the relevant System Information Block (SIB) as described later. The terms SI reading/decoding/acquisition, CGI/ECGI reading/decoding/acquisition, CSG SI reading/decoding/acquisition are interchangeably used but have the same or similar meaning. In order to read the SI to obtain the CGI of a cell the UE is allowed to create autonomous gaps during DL and also in UL. The autonomous gaps are created for example at instances when the UE has to read MIB and relevant SIBs of the cell, which depends upon the RAT. The MIB and SIBs are repeated with certain periodicity. Each autonomous gap is typically 3-5 ms in LTE and UE needs several of them to acquire the CGI.

Signal Measurements

The RSRP Reference Signal Received Power (RSRP) and Reference Signal Received Quality (RSRQ) are the two existing measurements used for at least RRM such as for mobility, which include mobility in RRC connected state as well as in RRC idle state. The RSRP and RSRQ are also used for other purposes such as for enhanced cell ID positioning, minimization of drive test etc.

The RSRP measurement provides cell-specific signal strength metric at a UE. This measurement is used mainly to rank different LTE candidate cells according to their signal strength and is used as an input for handover and cell reselection decisions. CRS are used for RSRP measurement. These reference symbols are inserted in the first and third last OFDM symbol of each slot, and with a frequency spacing of 6 subcarriers. Thus within a resource block of 12 subcarriers and 0.5 ms slot, there are 4 reference symbols.

The RSRQ is a quality measure which is the ratio of the RSRP and carrier Received Signal Strength Indicator (RSSI). The latter part includes interference from all sources e.g. co-channel interference, adjacent carriers, out of band emissions, noise etc.

The UE depending upon its capability may also perform inter-RAT measurements for measuring on other systems e.g. HSPA, Global System for Mobile Communications (GSM)/ GSM EDGE Radio Access Network (GERAN), Code Division Multiple Access (CDMA) 2000 Single-Carrier Radio Transmission Technology (1×RTT) and High Rate Packet Data (HRPD) etc. Examples of inter-RAT radio measurements which can be performed by the UE are Common Pilot Channel (CPICH) Received Signal Code Power (RSCP) and CPICH Ratio of chip Energy to Noise (Ec/No) i.e. CPICH received signal quality, for inter-RAT UTRAN, GERAN carrier RSSI for inter-RAT GSM and even pilot strength measurements for CDMA2000 1×RTT/HRPD. Wherein EDGE is the abbreviation for Enhanced Data Rates for GSM Evolution In RRC connected state the UE can perform intra-frequency measurements without measurement gaps. However as a general rule the UE performs inter-frequency and inter-RAT measurements in measurement gaps unless it is capable of performing them without gaps. To enable inter-frequency and inter-RAT measurements for the UE requiring gaps, the network has to configure the measurement gaps. Two periodic measurement gap patterns both with a measurement gap length of 6 ms are defined for LTE:

Measurement gap pattern #0 with repetition period 40 ms
Measurement gap pattern #1 with repetition period 80 ms The measurements performed by the UE are then reported to the network such as the network node, which may use them for various tasks.

The radio network node e.g. a base station may also perform signal measurements. Examples of radio network node measurements in LTE are propagation delay between UE and itself, UL Signal to Interference plus Noise Ratio (SINR), UL Signal-to-Noise Ratio SNR, UL signal strength, Received Interference Power (RIP) etc. The radio network node such as an eNB may also perform positioning measurements which are described in a later section.

Radio Link Monitoring Measurements

The UE also performs measurements on the serving cell also known as primary cell or PCell, in order to monitor the serving cell performance. This is called as Radio Link Monitoring (RLM) or RLM related measurements in LTE.

For RLM the UE monitors the downlink link quality based on the cell-specific reference signal in order to detect the downlink radio link quality of the serving or PCell.

In order to detect out of synchronization and in synchronization, the UE compares the estimated quality (Q) with thresholds Qout and Qin respectively. The threshold Qout and Qin are defined as the level at which the downlink radio link cannot be reliably received and corresponds to 10% and 2% block error rate of a hypothetical PDCCH transmissions respectively.

In non-Discontinuous Reception (DRX), downlink link quality for out of sync and in sync are estimated over an evaluation periods of 200 ms and 100 ms respectively.

In DRX, downlink link quality for out of sync and in sync are estimated over the same evaluation period, which scale with the DRX cycle e.g. period equal to 20 DRX cycles for DRX cycle greater than 10 ms and up to 40 ms.

In non-DRX, the out of sync and in sync status are assessed by the UE in every radio frame. In DRX the out of sync and in sync status are assessed by the UE once every DRX.

In addition to filtering on physical layer i.e. evaluation period, the UE also applies higher layer filtering based on network configured parameters. This increases the reliability of radio link failure detection and thus avoids unnecessary radio link failure and consequently RRC re-establishment. The higher layer filtering for radio link failure and recovery detection would in general comprise the following network controlled parameters:

Hysteresis counters e.g. N310 and N311 out of sync and in sync counters respectively.
Timers e.g. T310 RLF timer For example the UE starts the timer T310 after N310 consecutive Out Of Synchronization (OOS) detections. The UE stops the timer T310 after N311 consecutive IS detections. The transmitter power of the UE is turned off within 40 ms after the expiry of T310 timer. Upon expiry of T310 timer the UE starts T311 timer. Upon T311 expiry the UE initiates RRC re-establishment phase during which it reselects a new strongest cell.

In HSPA similar concept called out of sync and in sync detection are carried out by the UE. The higher layer filtering parameters (i.e. hysteresis counters and timers) are also used in HSPA. There is also Radio Link Failure (RLF) and eventually RRC re-establishment procedures specified in HSPA.

Sampling of Cell Measurement

The overall serving cell or neighbour cell measurement quantity results comprises of non-coherent averaging of 2 or more basic non-coherent averaged samples. The exact sampling depends upon the implementation and is generally not specified. An example of RSRP measurement averaging in E-UTRAN is shown in FIG. 3. FIG. 3 illustrates an Example of RSRP measurement averaging in E-UTRAN, wherein the UE obtains the overall measurement quantity result by collecting four non-coherent averaged samples or snapshots, each of 3 ms length in this example, during the physical layer measurement period, i.e. 200 ms, when no DRX is used or when DRX cycle is not larger than 40 ms. Every coherent averaged sample is 1 ms long. The measurement accuracy of the neighbour cell measurement quantity, e.g. RSRP or RSRQ, is specified over this physical layer measurement period. It should be noted that the sampling rate is UE implementation specific. Therefore in another implementation a UE may use only 3 snap shots over 200 ms interval. Regardless of the sampling rate, it is important that the measured quantity fulfils the performance requirements in terms of the specified measurement accuracy.

In case of RSRQ both RSRP, numerator, and carrier RSSI, denominator, should be sampled at the same time to follow similar fading profile on both components. The sampling also depends upon the length of the DRX cycle. For example for DRX cycle >40 ms, the UE typically takes one sample every DRX cycle over the measurement period.

A similar measurement sampling mechanism is used for other signal measurements by the UE and also by the BS for UL measurements.

Positioning

Several positioning methods for determining the location of the target device, which can be a UE, mobile relay, PDA etc. exist. The methods are:

Satellite based methods; it uses A-GNSS (e.g. A-GPS) measurements for determining UE position Observed Time Difference Of Arrival (OTDOA); it uses UE Reference Signal Time Difference (RSTD) measurement for determining UE position in LTE Uplink-Time Difference of Arrival (UTDOA); it uses measurements done at LMU for determining UE position Enhanced cell ID; it uses one or more of UE Rx-Tx time difference, BS Rx-Tx time difference, LTE RSRP/RSRQ, HSPA CPICH measurements, Angle of Arrival (AoA) etc for determining UE position. Fingerprinting is considered to be one type of enhanced cell ID method.

Hybrid methods; it uses measurements from more than one method for determining UE position.

In LTE the positioning node also known as E-SMLC or location server, configures the UE, eNodeB or Location Measurement Unit (LMU) to perform one or more positioning measurements. The positioning measurements are used by the UE or positioning node to determine the UE location. The positioning node communicates with UE and eNode B in LTE using LTE Positioning Protocol (LPP) and LPPa protocols respectively.

As mentioned above, In LTE NCT, arrangements of reference signals are different than the 3GPP Release 8 LTE carriers, LCT. In case of LCT, CRS also known as RS are transmitted by a network node in the DL in every DL subframe and over entire DL cell BW. However in case of cells on NCT the CRS are not transmitted in every DL subframe and may also be sent over limited cell BW.

The NCT carrier may also contain mixture of cells i.e. some operate using LCT and some operate using NCT. This will degrade the measurements performed by a UE on cells on such a "mixed NCT carrier".

Please note that the wordings "in cells" and "on cells" have an equal meaning and are used interchangeably in this document.

SUMMARY

It is therefore an object of embodiments herein to provide an improved way of enabling a UE to perform radio procedures in a communications network.

According to a first aspect of embodiments herein, the object is achieved by a method in a User Equipment, UE, for adapting a radio procedure. The UE obtains (502) information about signal configurations. The information indicates:
  whether or not a Downlink, DL, Reference Signal, RS, transmitted in cells on a first carrier frequency of a first carrier use the same one of a first and a second signal configuration, or
  whether or not the DL RS transmitted in the cells on the first carrier frequency use the same one of the first and the second signal configuration as that used for DL RS transmitted in a serving cell of the UE on the first carrier frequency.

The first signal configuration comprises the DL RS not being transmitted in every subframe. The second signal configuration comprises the DL RS being transmitted in every subframe and also in every resource block over an entire channel bandwidth of a neighbour cell. The UE then adapts a radio procedure based on the obtained information.

According to a second aspect of embodiments herein, the object is achieved by a method in a network node for assisting a User Equipment, UE, in adapting a radio procedure. The network node serves the UE. The network node sends information about signal configurations to the UE indicating:
  whether or not a Downlink, DL, Reference Signal, RS, transmitted in cells on a first carrier frequency of a first carrier use the same one of a first and a second signal configuration, or
  whether or not the DL RS transmitted in cells on the first carrier frequency use the same one of the first and the second signal configuration as that used for DL RS transmitted in a serving cell of the UE on the first carrier frequency.

The first signal configuration comprises the DL RS not being transmitted in every subframe. The second signal configuration comprises the DL RS being transmitted in every subframe and also in every resource block over an entire channel bandwidth of a neighbour cell.

According to a third aspect of embodiments herein, the object is achieved by a User Equipment, UE, for adapting a radio procedure. The UE comprises means configured to obtain information about signal configurations, which information indicates:
  whether or not a Downlink, DL, Reference Signal, RS, transmitted in cells on a first carrier frequency of a first carrier use the same one of a first and a second signal configuration, or
  whether or not the DL RS transmitted in the cells on the first carrier frequency use the same one of the first and the second signal configuration as that used for DL RS transmitted in a serving cell of the UE on the first carrier frequency.

The first signal configuration comprises the DL RS not being transmitted in every subframe. The second signal configuration comprises the DL RS being transmitted in every subframe and also in every resource block over an entire channel bandwidth of a neighbour cell. The means are further configured to adapt a radio procedure based on the obtained information.

According to a fourth aspect of embodiments herein, the object is achieved by a network node for assisting a User Equipment, UE, in adapting a radio procedure. The network node is capable of serving the UE. The network node comprising means configured to send information about signal configurations to the UE indicating:
  whether or not a Downlink, DL, Reference Signal, RS, transmitted in cells on a first carrier frequency of a first carrier use the same one of a first and a second signal configuration, or
  whether or not the DL RS transmitted in cells on the first carrier frequency use the same one of the first and the second signal configuration as that used for DL RS transmitted in a serving cell of the UE (120) on the first carrier frequency.

The first signal configuration comprises the DL RS not being transmitted in every subframe. The second signal configuration comprises the DL RS being transmitted in every subframe and also in every resource block over an entire channel bandwidth of a neighbour cell.

The UE obtains information indicating
  whether or not a Downlink, DL, Reference Signal, RS, transmitted in cells on a first carrier frequency of a first carrier use the same one of a first and a second signal configuration, or
  whether or not the DL RS transmitted in the cells on the first carrier frequency use the same one of the first and the second signal configuration as that used for DL RS transmitted in a serving cell of the UE on the first carrier frequency.

Based on the information, a radio procedure in a communications network with different carrier frequencies and different signal configurations can be performed in a relevant way since the UE is aware of type of carrier used for operating cells on a particular carrier. In this way, embodiments herein provides an improved way of enabling a UE to perform radio procedures in a communications network.

DETAILED DESCRIPTION

Figure 1:
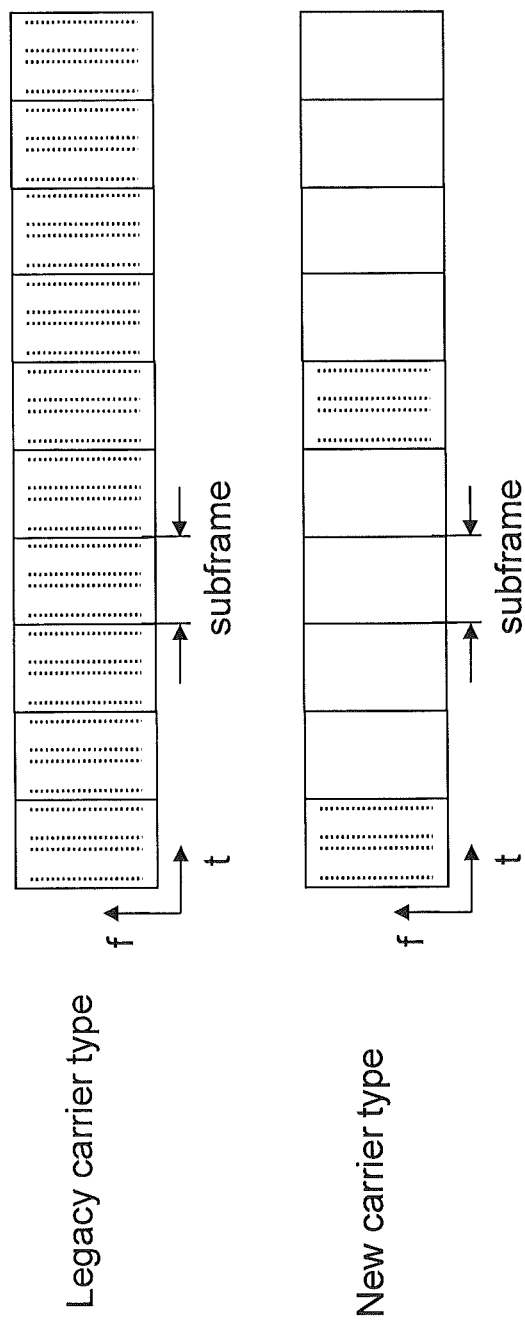
FIGS. 1 and 2 are diagrams illustrating Legacy Carrier Type with Common Reference Signals and New Carrier Type with Enhanced Synchronization Signal.
Figure 2:
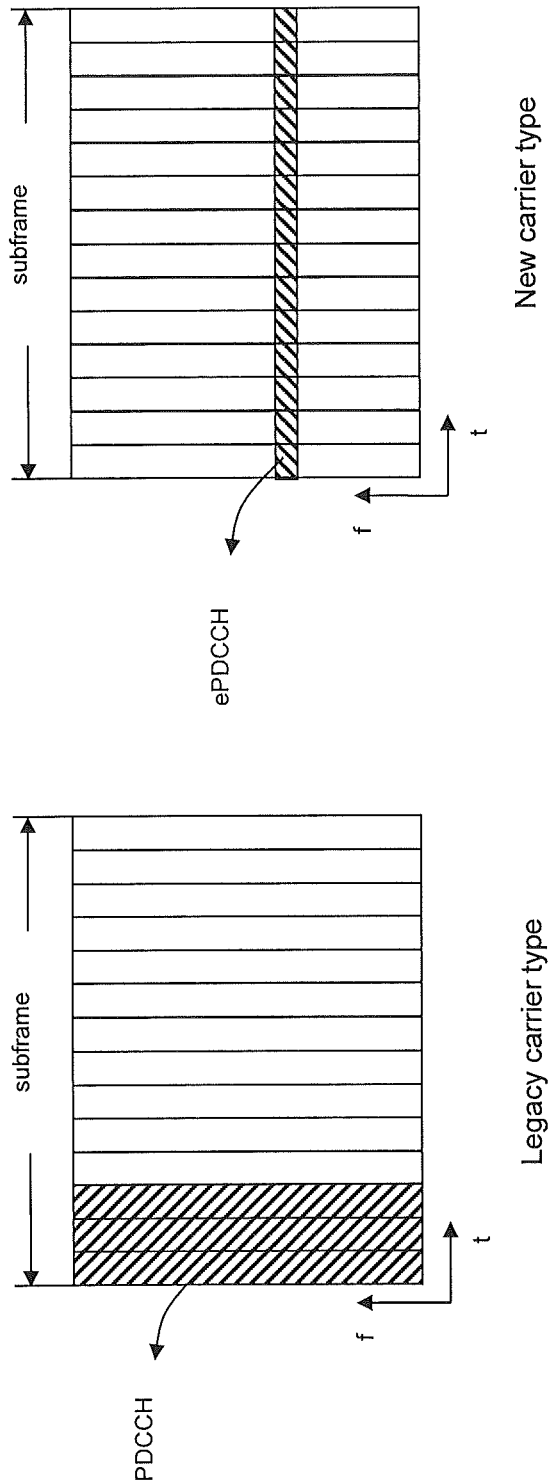
Figure 3:
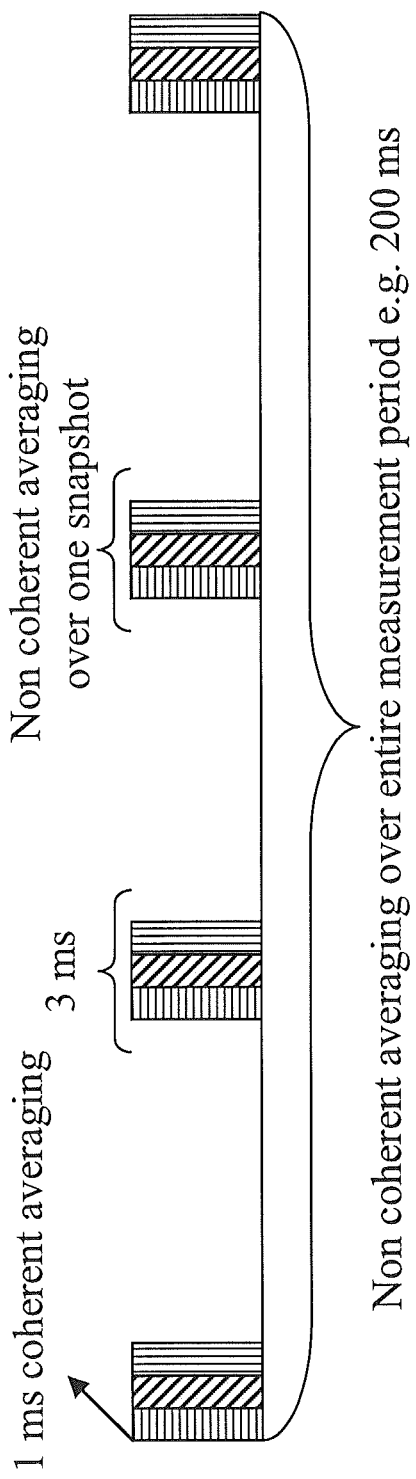
FIG. 3 is a diagram illustrating RSRP measurement averaging in E-UTRAN.

As part of developing embodiments herein a problem will first be identified and discussed.

In prior art a UE is only aware of the type of the carrier used for operating a serving cell i.e. PCell and SCell. This information is provided to the UE by the serving eNB. The type of carrier can be a New Carrier Type (NCT) or it can be a legacy carrier type (LCT). However, the UE is not aware of the carrier type used for operating neighbor cells. The UE assumes that all cells on a carrier operate using LCT or NCT. I.e. in existing solutions a UE assumes all cells on a carrier have the same CRS configuration i.e. all cells on NCT operate using NCT configuration. Therefore the UE may perform measurements on all cells in the same manner.

But due to introduction of NCT, some cells on a NCT carrier may operate using RS transmission using NCT configuration, e.g. CRS sent in a DL subframe only once every 5 ms, and remaining ones operate using RS transmission with LCT configuration, e.g. CRS sent in every DL subframe.

In existing solutions the UE assumes that all cells use NCT configuration on a carrier which is configured as NCT e.g. by serving eNB.

However in a network, where some cells operate using LCT and some other cells operate using NCT, the UE will not be able to adequately perform any one or more of intra-frequency measurements, inter-frequency measurements and inter-RAT measurements which are performed on CRS. This is because the RS signal transmission will not be the same in cells with NCT and LCT signal configuration. Normally the configurations of the serving cell is communicated to the UE, however the UE does not have any detailed information regarding the configuration of the neighboring cells, and neighboring bands, etc. That is the UE does not receive neighbor cell information e.g. BW of neighbor cells etc. Therefore a UE that is served by an NCT carrier may perform such measurements on LCT based on NCT configuration, and vice versa, that can result in inaccurate measurement. The UE may even fail to perform measurement on certain cells. It may also degrade UE battery, increase processing and may lead to failure to meet the measurement requirements.

It is therefore an object of embodiments herein to ensure that the UE is able to perform measurements efficiently and based on type of carrier, e.g. NCT or LCT, that is used in the cell.

Terminologies

The following commonly terminologies are used in the embodiments and are elaborated below:

Radio network node: In some embodiments the non-limiting term radio network node is more commonly used and it refers to any type of network node serving UE and/or connected to other network node or network element or any radio node from where UE receives signal. Examples of radio network nodes are Node B, Base Station (BS), Multi-Standard Radio (MSR) radio node such as MSR BS, eNode B, network controller RNC, base station controller, relay, donor node controlling relay, base transceiver station (BTS), access point (AP), transmission points, transmission nodes, RRU, RRH, nodes in distributed antenna system (DAS) etc.

Network node: In some embodiments a more general term "network node" is used and it may correspond to any type of radio network node or any network node, which communicates with at least a radio network node. Examples of network node are any radio network node stated above, core network node (e.g. Mobile Switching Center (MSC), Mobility Management Entity (MME) etc), Operating and Maintenance (O&M), operational support systems (OSS), Self-Organizing Networks (SON), positioning node (e.g. Evolved Serving Mobile Location Centre (E-SMLC), MDT etc.

User equipment: In some embodiments the non-limiting term User Equipment (UE) is used and it refers to any type of wireless device communicating with a radio network node in a cellular or mobile communication system. Examples of UE are target device, device to device UE, machine type UE or UE capable of machine to machine communication, Personal Digital Assistant (PDA), iPAD, Tablet, mobile terminals, smart phone, Laptop Embedded Equipped (LEE), Laptop Mounted Equipment (LME), Universal Serial Bus (USB) dongles etc.

The embodiments herein also applies to multi-point carrier aggregation systems.

Note that although terminology from 3GPP LTE has been used in this disclosure to exemplify the embodiments herein, this should not be seen as limiting the scope of the embodiments herein to only the aforementioned system. Other wireless systems, including WCDMA, WiMax, Ultra Mobile Broadband (UMB) and GSM, may also benefit from exploiting the ideas covered within this disclosure.

Also note that terminology such as eNodeB and UE should be considering non-limiting and does in particular not imply a certain hierarchical relation between the two; in general "eNodeB" may be considered as device 1 and "UE" device 2, and these two devices communicate with each other over some radio channel. Herein, we also focus on wireless transmissions in the downlink, but the embodiments herein are equally applicable in the uplink.

In this section, the embodiments herein will be illustrated in more detail by a number of exemplary embodiments. It should be noted that these embodiments are not mutually exclusive. Components from one embodiment may be tacitly assumed to be present in another embodiment and it will be obvious to a person skilled in the art how those components may be used in the other exemplary embodiments.

Figure 4:
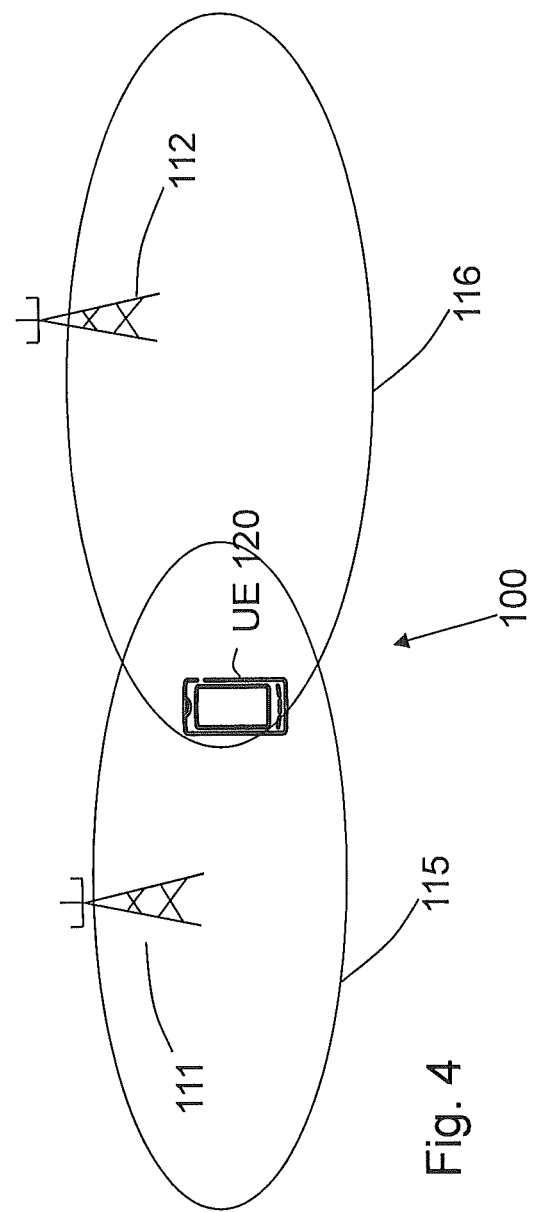
FIG. 4 is a diagram illustrating a wireless communications network according to some embodiments.

FIG. 4 depicts an example of a wireless communications network 100 in which embodiments herein may be implemented. The wireless communications network 100 is a wireless communication network such as an LTE, WCDMA, GSM network, any 3GPP cellular network, Wimax, any cellular network or system, or any system as mentioned under terminology above.

The wireless communications network 100 comprises a plurality of network nodes whereof two, a network node 111 and another network node, referred to as a second network node 112 are depicted in FIG. 4. The network node 111 and the second network node 112 may each be a transmission point such as a radio base station, for example an eNB, ah eNodeB, or an Home Node B, an Home eNode B, any other network node capable to serve a UE or a machine type communication device in a wireless communications network, or any node as mentioned under terminology above. In the example scenario the network node 111 serves a cell 115, and the second network node 112 serves a second cell 116.

A UE 120 operates in the wireless communication network 100. The UE 120 may e.g. be a mobile terminal or a wireless terminal, a mobile phone, a computer such as e.g. a laptop, a PDA, a tablet computer, sometimes referred to as a surf plate, with wireless capability, any other radio network units capable to communicate over a radio link in a wireless communications network, or any system as mentioned under terminology above. Please note the term user equipment used in this document also covers other wireless devices such as Machine to machine (M2M) devices, even though they do not have any user. In the example scenario, the UE 120 is located in the cell 115 and is served by the network node 111. The second cell 116 is a neighbor cell to the UE 120, and the second network node is a neighbor network node to the serving network node 111 of the UE 120.

The embodiments disclose methods to enable the UE 120 to enhance awareness in terms of type of carrier used for operating cells on a particular carrier.

The NCT and LCT differ in that they use different configuration for transmitting the same type of reference signals in a cell e.g. CRS or DL RS, synchronization signals e.g. primary synchronization signal (PSS) and/or secondary synchronization signal (SSS). The NCT carrier is characterized by a first signal configuration whereas the LOT is characterized by a second signal configuration. For example cells using NCT and LCT may have different CRS configuration but they may also have different PSS and/or SSS configuration e.g. PSS and/or SSS may be sent in different time-frequency resources in cells using NCT and LCT. These terminologies are used herein and are elaborated below.

The First Signal Configuration (FSC), which is used for operating a cell using NCT, comprises a DL RS which is NOT transmitted in at least every subframe. The DL RS comprise CRS. But it may also comprise of additional signals such as PSS and/or SSS or any other type of reference signal. The first signal configuration may further comprise not transmitting the DL RS in at least every resource block over the channel bandwidth of the cell being operated using NOT. In one example the FSC may comprise DL RS, e.g. CRS, transmitted every 5th subframe, e.g. only in every subframe #0 and subframe #5 but not in remaining ones, and in every RB over entire cell BW, e.g. in every RB in a cell BW of 50 RBs. In a second example the FSC may comprise DL RS, e.g. CRS, transmitted every 5th subframe, e.g. only in every subframe #0 and subframe #5 but not in remaining ones, and in only half as many RBs over entire cell BW, e.g. in only central 25 RBs in cell BW of 50 RBs. The number of RBs which contain DL RS may be pre-defined, e.g. always 25 RBs for cell BW≥25 RBs regardless of how large is the cell BW or it may be configurable in each cell.

The Second Signal Configuration (SSC), which is used for operating a cell using LCT, comprises a DL RS which is transmitted in every subframe and also in every resource block over the entire channel BW of the cell being operated using NCT. For example SSC comprises the DL RS, e.g. CRS, transmitted in every DL subframe and in every RB in a cell with Bandwidth (BW) of 50 RBs i.e. cell BW is 50 RBs The embodiments herein may comprise the following embodiments:
- Method in the UE 120 of obtaining RS configuration on a carrier and adapting procedure
- Method in the network node 111 of determining RS configuration on a carrier and signaling to UE
- Method in the UE 120 of signaling capability of handling measurements on NCT.

Figure 5:
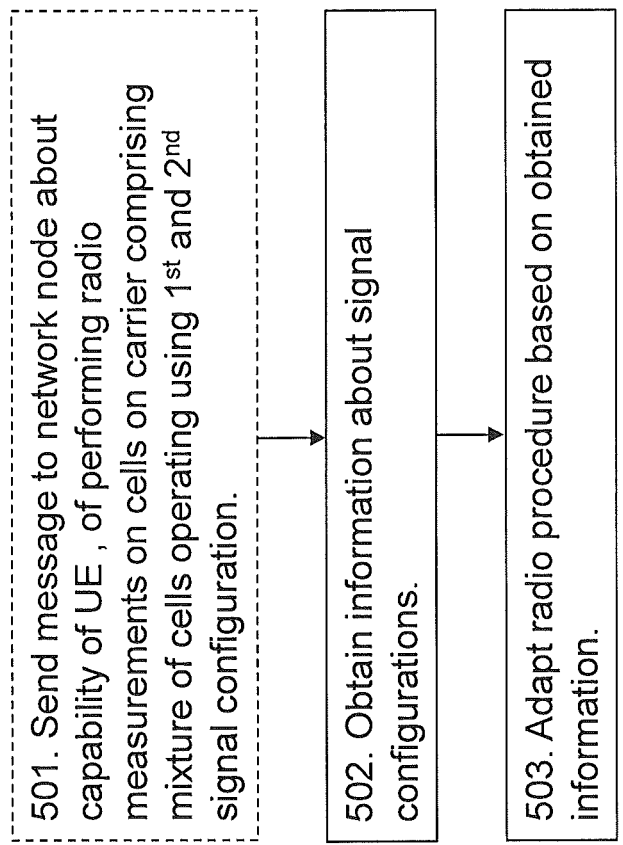
FIG. 5 is a flow chart illustrating operations of a UE according to some embodiments.

Embodiments of a method will first be described in a general way in a view seen from the UE 120 here, followed by a view of the network node 111. The methods will then be explained and described more in detail below. Thus example embodiments of a method in the UE 120 for adapting a radio procedure, will now be described with reference to a flowchart depicted in FIG. 5.

The method is described in a general way first. The method will then be described more in detail below. The method comprises the following actions, which actions may be taken in any suitable order. Dashed lines of some boxes in FIG. 5 indicate that this action is not mandatory.

Action 501

This action is optional. All UEs may not be capable of performing measurements on carriers in cells with different configurations, i.e. on carriers which comprises a mixture of cells with different configurations, e.g. in cells with a first configuration and a second configuration. Different here means the same as mixture. In this action a UE such as e.g. the UE 120, that is capable of performing measurements on both first and second configuration, sends a message to the network node 111 informing that it is capable of performing measurements both in cells with the first configuration and in cells with the second configuration, i.e. the mixture of cells. Therefore according to some embodiments, the UE 120 sends a message to a network node 111. The message comprises information about the capability of the UE 120, indicating that the UE 120 is capable of performing radio measurements on a carrier which comprises a mixture of cells operating using the first and the second signal configuration. This an advantage to know, since e.g. if a UE is not capable, such UE will not be configured to measure on carriers with different configurations.

The information about the capability of the UE 120 may further comprises additional information comprising any one or more out of:
- whether the UE 120 is capable of autonomously determining RS configuration of cells on a carrier which comprises a mixture of cells operating using the first and the second signal configurations, and
- whether the UE 120 is capable of performing radio measurements in cells on a specific carrier which comprises a mixture of cells operating using the first and the second signal configuration. The specific carrier may e.g. be any one or more out of a serving carrier, an inter-frequency carrier and an inter-RAT carrier.

Action 502

To be able to perform measurements later on the UE 120 obtains information about signal configurations.

The information indicates whether or not a DL RS transmitted in cells on a first carrier frequency of a first carrier use the same one of a first and a second signal configuration. Or as an alternative, the information indicates whether or not the DL RS transmitted in the cells on the first carrier frequency use the same one of the first and the second signal configuration as that used for DL RS transmitted in a serving cell of the UE 120 on the first carrier frequency The first signal configuration comprises the DL RS not being transmitted in every subframe, and the second signal configuration comprises the DL RS being transmitted in every subframe and also in every resource block over an entire channel bandwidth of a neighbour cell.

In this way the UE 120 gets information enabling the UE 120 to perform measurements efficiently and based on type of carrier, e.g. NCT or LCT, that is used in the cell of the first carrier.

In some embodiments, the obtaining of the information about signal configurations further comprises obtaining information indicating whether or not cells on a second carrier frequency of a second carrier operate using the same one of a first and a second signal configuration. The second carrier frequency is a non-serving carrier frequency for the UE 120. It may e.g. be an inter-frequency carrier. The second carrier may e.g. be served by the second network node 112. For example the information may relate to whether all neighbor cells use the first signal configuration or the second signal configuration or some cells use the first signal configuration whereas remaining ones use the second signal configuration.

The UE 120 may also obtain, determine, acquire or receive the above information for plurality of serving carrier frequencies and/or for plurality of non-serving carrier frequencies.

The obtaining of the information about signal configurations may be performed by autonomously determining whether a signal configuration of cells on the same carrier is the first or the second signal configuration, based on radio measurements.

The obtaining of the information about signal configurations may e.g. be based on one or more pre-defined rules out of:
- assuming that all cells on the first or the second carrier operate using first signal configuration if the information about signal configurations is not signaled to the UE 120 for that carrier,
- assuming that all neighbor cells on the first or the second carrier operate using the same signal configuration out of the first and the second signal configuration as that used in a cell serving the UE 120 if the information about signal configurations is not signaled to the UE 120 for that carrier,
- assuming that cells on one or more second carriers use the same signal configuration out of the first and the second signal configuration, as that of a reference carrier if the information about signal configurations is not signaled to the UE 120 for one or more second carriers but it is signaled to the UE 120 for the reference carrier.

The reference carrier may be a carrier whose at least one cell uses the first signal configuration.

In some embodiments the UE 120 obtains the information about signal configurations by receiving it from a node. The node may be any one out of: another UE or a network node 111 serving the UE 120. In some of these embodiments, the received information comprises one or more out of:
- whether all cells on the same carrier use the same or different signal configuration,
- whether serving and neighboring cells on the same carrier use the same or different signal configuration,
- whether the reference cell and neighboring cells on the same carrier use the same or different signal configuration, wherein the reference cell and neighbor cells are used by the UE 120 for at least positioning measurement,
- whether cells on the first and the second carrier use the same or different signal configuration, where the first and the second carrier are both serving carriers, and
- whether cells on the first and the second carrier use the same or different signal configuration, where the first and the second carrier are a serving carrier of the UE 120 and a non-serving carrier of the UE 120 respectively.

Action 503

The UE 120 now applies the information about signal configurations.

Thus the UE 120 adapts a radio procedure based on the obtained information.

The radio procedure may be any one or more out of:
a measurement procedure,
a procedure of signaling obtained information about signal configurations to other nodes, and
a procedure of logging obtained information about signal configurations for Minimization of Drive Test, MDT, operation.

In some embodiments, the radio procedure is a measurement procedure: In these embodiments, the adapting of the radio procedure based on the obtained information, may be performed by adapting a measurement sampling or an instance when the UE 120 shall obtain samples for one or more types of radio measurements. The measurement is any one out of: intra-frequency, inter-frequency and inter-Radio Access Technology, RAT measurements.

The radio procedures will be described more in detail below.

Figure 6:
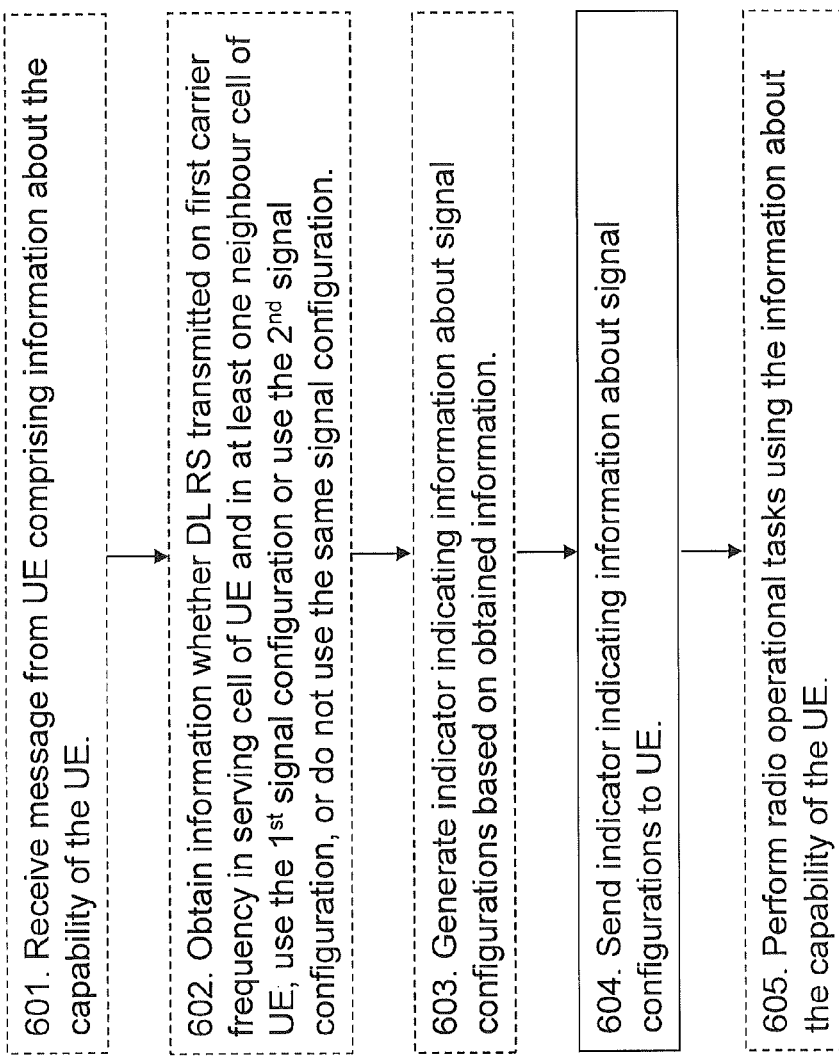
FIG. 6 is a flow chart illustrating operations of a network node according to some embodiments.

Embodiments of a method will now be described in a general way, in a view seen from the network node 111. Example embodiments of a method in the network node 111 for assisting a UE 120 in adapting a radio procedure, will now be described with reference to a flowchart depicted in FIG. 6. The network node 111 serves the UE 120.

The method comprises the following actions, which actions may be taken in any suitable order. Dashed lines of some boxes in FIG. 6 indicate that this action is not mandatory.

Action 601

In some embodiments, the network node 111 receives a message from the UE 120. The message comprises information about the capability of the UE 120, indicating that the UE 120 is capable of performing radio measurements on a carrier which comprises a mixture of cells operating using first and second signal configurations.

The information about the capability of the UE 120 may further comprise additional information comprising any one or more out of:
- whether the UE 120 is capable of autonomously determining RS configuration of cells on a carrier which comprises a mixture of cells operating using first and second signal configurations,
- whether the UE 120 is capable of performing radio measurements in cells on a specific carrier which comprises a mixture of cells operating using first and second signal configurations, which specific carrier is any one or more out of a serving carrier, an inter-frequency carrier and an inter-RAT, carrier.

Action 602

In some embodiments, the network node 111 obtains information whether the DL RS transmitted on the first carrier frequency in the serving cell of the UE 120 and in at least one neighbour cell of the UE 120, use the first signal configuration or use the second signal configuration, or do not use the same signal configuration. This information may be obtained from another node, from the UE 120, or from another UE. This information may serve as a base for generating an indicator in Action 603 below, indicating information about signal configurations to be sent to the UE 120 in Action 604 below.

The obtained information may further comprises any one or more out of:
- a DL RS bandwidth of a cell operating using first signal configuration,
- a carrier frequency of the first or the second carrier on which a cell operates,
- a cell type and/or power class of a network node serving the cell on the first or the second carrier,
- location of a cell, e.g. geographical coordinates of each cell, coverage area of group of cells,
- an indication whether all cells on the same carrier frequency operate using the first or the second signal configuration or some operate using the first signal configuration and remaining ones using the second signal configuration.

In some embodiments, the obtained information comprises information for several neighboring cells of the network node 111.

Action 603

In some embodiments, the network node 111 generates an indicator based on the obtained information. The indicator indicates information about signal configurations to be sent to the UE 120 in Action 604 below.

Action 604

The network node 111 sends information about signal configurations to the UE 120 indicating:

- whether or not a Downlink, DL, Reference Signal, RS, transmitted in cells on a first carrier frequency of a first carrier use the same one of a first and a second signal configuration, or
- whether or not the DL RS transmitted in cells on the first carrier frequency use the same one of the first and the second signal configuration as that used for DL RS transmitted in a serving cell of the UE 120 on the first carrier frequency, wherein the first signal configuration comprises the DL RS not being transmitted in at least every subframe, and wherein the second signal configuration comprises the DL RS being transmitted in every subframe and also in every resource block over an entire channel bandwidth of a neighbour cell.

The information about signal configurations may further comprise:

- whether all cells on the same carrier use the same or different signal configuration,
- whether serving and neighboring cells on the same carrier use the same or different signal configuration,
- whether reference and neighboring cells on the same carrier use the same or different signal configuration, wherein reference cell and neighbor cells are used by the UE 120 for at least positioning measurement,
- whether cells on the first carrier frequency and a second carrier frequency of a second cell use the same or different signal configuration, where the first and the second carrier are both serving carriers
- whether cells on the first and the second carrier use the same or different signal configuration, where the first and the second carrier are serving carrier and non-serving carrier respectively.

Action 605

In some embodiments, the network node 111 performs one or more radio operational tasks using the information about the capability of the UE 120, obtained in Action 601.

The methods described above will now be described and explained more in detail. This means that the following explanations and examples may be applicable to any of the embodiments described above.

Contents of Obtained Configuration Information Such as RS Configuration Information This relates to Action 502. This embodiment discloses a method in the UE 120 to obtain information such as an indication informing the UE 120 whether a serving cell and at least one neighbor cell on a first carrier operate using the same signal configuration or not. The first carrier may be at least one of the serving carrier frequency e.g. SCC. For example whether both serving cell such as the cell 115 and at least one neighbor cell such as the second cell 116 use first signal configuration or second signal configuration or different signal configurations. In one scenario, the serving cell operate using the first signal configuration and the neighbor cell operate using the second signal configuration, or alternatively the serving cell operate using the second signal configuration and the neighbor cell operate using the first signal configuration. The UE 120 receives the signal configuration information for the serving cell e.g. of SCell on NCT, in this way the UE 120 knows the signal configuration of the serving cell. Therefore the UE 120 may determine whether neighboring cells use the first or second configuration by combining the two sets of information, the serving cell signal configuration and the indication whether a serving cell and at least one neighbor cell on a first carrier operate using the same signal configuration or not. The obtained information may also be expressed in other manner. For example it may indicate whether:

- All cells on the first carrier use the same signal configuration, e.g. either all use first configuration or all use the second configuration, or use different signal configuration i.e. some cells use first and remaining ones use second configuration.
- All neighboring cells on the first carrier operate using the same signal configuration as that being used by the serving cell or reference cell, or all neighboring cells on the first carrier operate using different signal configuration as that being used by the serving cell or reference cell. A reference cell as described herein, is a cell whose signal configuration is known to the UE 120.

Mechanisms of Obtaining Configuration Information Such as RS Configuration Information Also this relates to Action 502. The UE 120 may obtain the above indicated RS configuration information of cells operating on one or more carriers by using one or more of the following ways: Autonomous determination, pre-defined rules, receiving from another node, and combined mechanism.

Autonomous Determination

In this mechanism the UE 120 autonomously determines the signal configuration of cells on the same carrier based on radio measurements, i.e. the UE 120 autonomously determines whether they, i.e. the cells, all operate using first signal configuration such as NCT or second signal configuration such as LCT, or some cells use the first signal configuration and remaining ones use the second signal configuration.

As an example the UE 120 may measure on at least two DL subframes in a frame in a cell e.g. in first and second DL subframes in the same radio frame. It is assumed that NCT which uses first signal configuration uses DL RS e.g. CRS, only in first and fifth subframes in a frame. Therefore the UE 120 may perform a radio measurement by correlating over CRS with known set of CRS configurations in a first subframe e.g. subframe #0, and also in at least one or more additional subframes e.g. subframe #1, subframe #2 etc., in the same radio frame e.g. the second subframe. If based on the measurement or correlation operation, first and second subframes are determined to contain CRS then the carrier is determined to be LCT, otherwise it is determined to be NCT carrier. The presence of CRS is determined if the correlation result or output is above a threshold. Otherwise it is determined to be absent. This mechanism is also called blind detection i.e. detection by UE 120 using correlation operation but without receiving any information from the network or any other source e.g. another UE, about RS configuration of the cell.

Measured subframes: (n,n+1); n=0, 5, 10, . . . .

In general, the measured subframes may be any other subframe(s) together with subframe number 0, 5, . . . . For example in case of measurement on two extra subframes Measured subframes: (n,n+k1, n+k2); n=0, 5, 10, . . . ; k1, k2{1, 2, 3, 4}.

Note that in case of Time Division Duplex (TDD), the values of k, k1, and k2 must satisfy the extra condition that subframe number n+k, n+k1, and n+k2 must be downlink subframes.

Alternatively or together with the above method, the measurement may be done on both antenna port 0 and antenna port 1, which carry the reference signal, and since Extended Synchronization Signals (ESS) only is transmitted on port 0, then in a similar manner it is possible to differentiate between ESS and CRS, or in another word, between NCT and LCT.

Here two distinct cases are exemplified for different default networks:

NCT is the default mode in the network such as the wireless communications network 100. In this case, the existence of CRS on subframes other than 0, 5, ... or on ports other than port 0 may be detected by e.g. comparing the correlation of the RS with a reference level. If the correlation is above some certain threshold then a CRS exists in that subframe and the cell is running LCT.

LCT is the default mode in the network such as the wireless communications network 100. In this case, the UE 120 assumes that there are CRSs in all subframes and on both port 0 and port 1. If the correlation is below some certain threshold then a CRS exists in that subframe and the cell is running LCT. This may be applied to one or a few subframes for improved reliability.

The UE 120 may further use positioning information and store this with the historical information about the signal configuration of cells on the same carrier. The obtained information, e.g. whether all cells operate using first or second configuration or different configurations, is applicable in certain region or geographical area as determined by positioning.

The UE 120 may perform the above procedure to determine whether a cell operate using first or second signal configuration for plurality of cells on each carrier. The UE 120 may store this information for each cell on a carrier and use this historical data for radio operational tasks as described in preceding sections.

Pre-Defined Rules

In this mechanism the UE 120 determines the signal configuration of cells on the same carrier for one or more carrier based on one or more pre-defined rules. Examples of pre-defined rules are:

The UE 120 may assume that all cells on a carrier operate using first signal configuration if the RS configuration indicator is not signaled to the UE 120 for that carrier.

The UE 120 may assume that all neighbor cells on a carrier operate using the same signal configuration as that on a serving cell if the RS configuration indicator or related information is not signaled to the UE 120 for that carrier. The serving cell may be on the same carrier or on another carrier. It may also be pre-defined to be the PCell or a specific SCell e.g. SCell that is configured on a NCT carrier.

The UE 120 may assume that cells on one or more second carriers use the same RS signal configuration as that of the reference carrier in case RS configuration indicator or related information is not signaled to the UE 120 for one or more second carriers but it is signaled to the UE 120 for the reference carrier. The reference carrier may be a serving carrier e.g. SCC which contains at least one cell operating with NCT configuration.

It may be pre-defined that the UE 120 shall meet one or more radio measurement requirements for one or more radio measurements performed in one or more cells on a carrier with mixture of cells such as e.g. cells with NCT and LCT signal configurations, or on any NCT carrier provided. The UE 120 may receive at least an indication or any information from network node 111 that there are mixed cells such as NCT and LCT on that carrier. The indication informs the UE 120 about RS configuration in cells e.g. any of the indications disclosed under section "Receiving from a node" below. Examples of requirements are measurement requirements e.g. cell identification delay, RSRP and RSRQ measurement period, accuracy of any radio measurements, number of identified cells to be measured on a carrier etc.

Receiving from a Node

According to this mechanism the UE 120 receives explicit information from a node about the signal configuration of cells on a carrier, which may be a serving carrier or a non-serving carrier. The node may be a serving network node e.g. serving eNB, BS, relay, positioning node etc., or it may be another UE such as e.g. a second UE, UE2; in direct Device to device (D2D) communication.

In LTE the neighbor cell list is not signaled to the UE. Therefore network cannot provide signal configuration for every cell on a carrier. A few examples of the explicit information, also known as an RS configuration indicator for a carrier, received by the UE 120 as disclosed herein are:

An indication informing the UE 120 whether all cells on the same carrier use the same or different signal configuration, An indication informing the UE 120 whether serving and neighboring cells on the same carrier use the same or different signal configuration, An indication informing the UE 120 whether reference and neighboring cells on the same carrier use the same or different signal configuration. Signals sent on reference cell and neighbor cells are used by the UE 120 for at least positioning measurement, An indication informing the UE 120 whether cells on first and second carriers use the same or different signal configuration, where the first and second carriers may be serving carrier e.g. SCC, and non-serving carrier e.g. inter-frequency carrier, Any of the above information may also be associated with the geographical information e.g. set of geographical coordinates, in which it applies i.e. cells which are located in the indicated location.

The network node 111 acquires or determines the above indication as described below in relation to the method in the network node 111.

Combined Mechanism

In the combined mechanism the UE 120 uses at least the autonomous information and received indication from the network node 111 or from another UE to determine more comprehensive information about the signal configuration used by cells on the same carrier and may also do so for plurality of carriers.

The UE 120 may further use the existing serving cell signal configuration such as that it operates using NCT or first signal configuration, to determine more comprehensive information about the signal configuration used by cells on the same serving carrier.

For example if the received indication informs the UE 120 that serving cell and neighboring cells use different signal configuration then UE 120 may autonomously determine configuration on one or more neighbor cells and thereby create a history of the signal configuration of cells on that carrier. The information obtained using combined mechanism may also be applicable for certain part of the network or coverage area. The area may be determined by the UE 120 using a positioning mechanism.

Method of Adapting Radio Procedure Based on Obtained Configuration Information

This relates to Action 503. According to an aspect of this embodiment, the UE 120, upon obtaining the information about the signal configuration of cells on a carrier as disclosed above, adapts one or more radio procedures. Examples of radio procedures are any one or more of: adapting measurement procedure, signaling determined configuration to other nodes, and logging determined configuration for MDT operation.

Adapting Measurement Procedure

According to this procedure the UE 120 adapts its measurement sampling or instance when it should obtain samples for one or more types of radio measurements e.g. cell identification, path loss, RSRP, RSRQ, UE Rx-Tx time difference measurement etc. The measurements may be performed without measurement gap or they may be performed in measurement gaps. The measurements may be intra-frequency, inter-frequency or inter-RAT measurements.

For example if network node 111 indicates that not all cells on a carrier use the same signal configuration or that some cells use NCT or first signal configuration whereas remaining ones use second signal configuration, then the UE 120 may:

- Only perform measurement in those subframes which contain the DL RS or
- Only perform measurement in those subframes which contain the DL RS and only in one or few additional DL subframes i.e. not in all.
- Performs different measurement procedures based on the type of the cell such as e.g. NCT or LCT, if the type of cell is indicated by the network or blindly detected by the UE 120.
- Turn off its receiver to save battery during subframes in which it does not perform measurement sampling.
- Perform any of the above for cells located in geographical area where the obtained information applies as indicated by other node or determined by the UE 120 itself.

After performing the radio measurements the UE 120 may report the results to the network node 111 and/or it may use them for one or more tasks e.g. positioning, cell selection, cell reselection etc.

Signaling Determined Configuration to Other Nodes

According to this aspect of an embodiment, the UE 120 may signal the obtained information about the signal configuration used in cells on a carrier e.g. based on autonomous or combined information, to the network node 111 or to another UE such as e.g. a peer UE2, when the UE 120 is the other peer UE1 in direct D2D communication. For example the UE 120 may send either signal information about each or several cells on a carrier or an indication to the other node. The indication may comprise of any of the information disclosed in section "Receiving from a node" above. The information obtained from one node may also be signaled to another node e.g. signal configuration information obtained from old, such as source, serving network node about a carrier may be signaled to new, such as target, serving network node after a cell change. The receiving node may use this information for updating measurement configuration etc.

Logging Determined Configuration for MDT Operation

The UE 120 may also log or store the obtained information related to the signal configuration for cells on different carriers and also the geographical coordinates of region or coverage area where this applies. The UE 120 may report this to the serving cell when UE 120 connects to the serving cell as part of MDT information.

Method in the Network Node 111 of Determining RS Configuration on a Carrier and Signaling to UE 120

This embodiments provides a method in the network node 111 of determining an indication to be signaled to UE 120 as described in section "Receiving from a node" above and signaling it to the UE 120. As mentioned above the network node 111 may perform the following tasks:

- Determine the RS configuration on plurality of cells on at least one carrier,
- Generate an indicator based on determined configuration, and
- Signal obtained information related to the determined RS configuration to UE 120 for at least one carrier.

The above steps are elaborated below:

Method of Determining RS Configuration on a Carrier

This relates to the obtaining of information whether the DL RS transmitted on the first carrier frequency in the serving cell of the UE (120) and in at least one neighbour cell of the UE (120), use the first signal configuration or use the second signal configuration, or do not use the same signal configuration in Action 602 above. In this embodiment the network node 111 obtains information related to signalling, such as RS, configuration of neighboring cells on a carrier frequency from another node or from the UE 120. The network node 111 may obtain the RS configuration for plurality of carriers, which may or may not be used by the network node 111. Typically the information is obtained from neighboring nodes e.g. from neighboring eNB such as the second network node 112 via an X2 interface, eNBs are connected to each other via the X2 interface. The information may also be obtained from O&M, OSS, SON nodes.

The RS configuration information may comprise one or more of the following:

- Whether a cell operates using first signal configuration such as NCT or using second signal configuration such as LCT,
- DL RS BW of cell operating using first signal configuration if the BW is configuration,
- Carrier frequency such as channel number such as EARFCN of DL and/or UL carrier on which a cell operates,
- Cell identifiers e.g. PCI, CGI etc.,
- Cell type and/or power class of network node 111 serving the cell e.g. macro cell, pico cell, etc. or power class such as high power node (HPN), (LPN) etc.,
- Location of cells e.g. geographical coordinates of each cell, coverage area of group of cells,
- Indication whether on certain carrier frequency all cells operate using NCT or LCT or some operate using NCT and remaining ones using LCT.

The network node 111 may store the above received information and generate an indicator as described in the next section.

Method of Generating RS Configuration Indicator Based on Determined Configuration This relates to Action 603 above. As described earlier that the network node 111 e.g. serving network node 111, positioning node etc., may signal an indicator for a carrier frequency to the UE 120 to indicate for example whether all cells operate using NCT or LCT or combination thereof.

The network node 111 uses the received RS configuration to generate such an indicator. For example the network node 111 may obtain RS configuration information for several neighboring cells i.e. neighbor to the network node 111. The network node 111 may consider all or subset of cells on a carrier for generating the RS configuration indicator for the cells on that carrier. For example the network node 111 may consider only 7-10 cells which are closest to the network node 111. Their proximity may be determined based on their location with respect to that of the network node 111. This is because UE 120 is required to perform radio measurements on certain number of cells on a carrier e.g. up to 7 cells on serving carrier. For example if all the cells in the selected set of cells have the same RS configuration e.g. first configuration then the network may generate an indicator indicating that all cells operate using the same RS configuration.

Method of Signaling RS Configuration Information
Signaling to UE 120

This relates to Action 603 above. In this embodiment, a method is provided of transmitting the generated indicator such as e.g. an RS indicator, in a message from the network node 111 to the UE 120 to e.g. indicate whether all cells in the network are NCT or LCT or that there are both LCT and NCT carriers in the network. The UE 120 may be configured to know the meaning of the indicator.

Examples of such message may be like the following:

In one example the indicator is sent using 1 bit information which may be 1 or 0:

When the information is 0, all cells on a carrier operate using NCT configuration, i.e. first signal configuration in the network.

When the information is 1, there are one or more cells operating using NCT and also one or more cells operating using LOT configuration on a carrier in the network.

In another example the indicator is also sent using 1 bit information with the following meaning:

When the information is 0, serving cell and neighboring cells operate using the same signal configuration on a carrier in the network.

When the information is 1, serving cell and neighboring cells operate using different signal configuration on a carrier in the network.

In yet another example the indicator is also sent using 1 bit information with the following meaning:

When the information is 0, neighboring cells on a carrier operate using the same signal configuration as used for operating the serving cell on a carrier.

When the information is 1, neighboring cells on a carrier don't operate using the same signal configuration as used for operating the serving cell on a carrier.

The message containing the above indication may also contain:

Signal configuration of one or more serving cells e.g. indication that serving cell operates using NCT.

Carrier frequency information for each carrier e.g. UL E-UTRA Absolute Radio Frequency Channel Number (EARFCN) and/or DL EARFCN. Alternatively the above indicator may be applicable for all configured carrier frequencies or to a specific carrier e.g. SCC.

The indication may be in the form of a broadcast signal that is sent to all UEs in the network or sent as part of a UE specific message e.g. on shared channel such as PDSCH. The message containing indication and associated information may be signaled to the UE 120 via RRC message or it may also be signaled via L1 control channel such as e.g. PDCCH, or in a Medium Access Control (MAC) Protocol Data Units (PDU) or MAC command. The L1 control channel carriers information related to physical layer e.g. power control command, Hybrid Automatic Repeat Request (HARQ) feedback such as Acknowledgement (ACK) and Non-ACK (NACK) etc. Typically the message is sent to the UE 120 in an Information Element (IE) containing the measurement configuration. The message may be sent by any network node such as the network node 111 that requests the UE 120 to do a measurement. For example an eNB such as the network node 111 sends the message to the UE 120 for doing intra-frequency and/or inter-frequency measurements. But it may also be sent to the UE 120 by RNC and/or Base Station Controller (BSC) for doing inter-RAT measurements on an LTE carrier which contains mix of cells with NCT and LCT signal configuration.

Note that the above signaling may e.g. be used in both carrier aggregation mode and stand-alone carrier mode.

Figure 7:
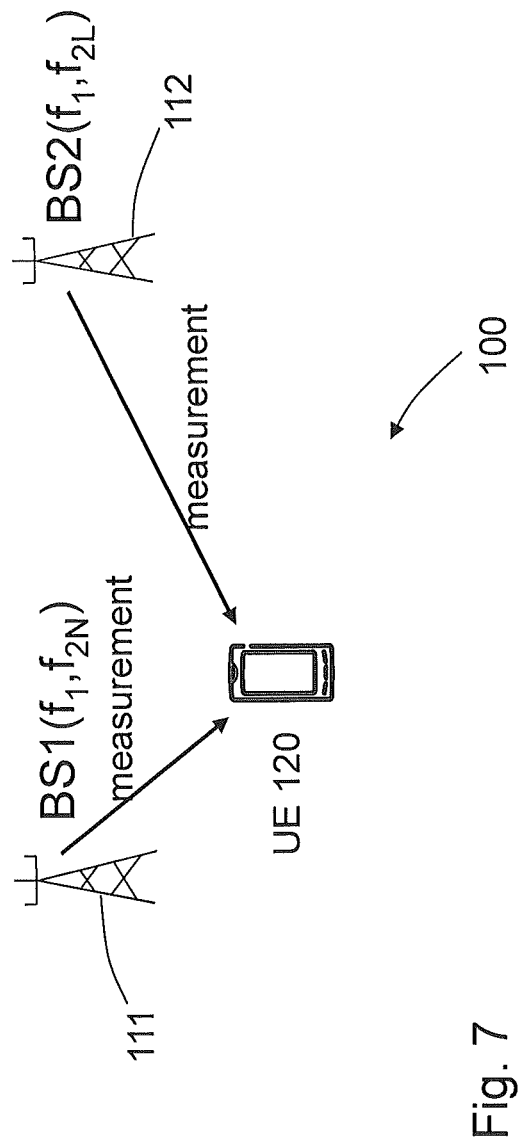
FIG. 7 is a diagram illustrating carrier aggregation according to some embodiments.

FIG. 7 illustrates such case for a carrier aggregation mode with a LCT on Pcell, and on Scell there is either an LCT or a NCT. This means that on a carrier like on SCC there can be mixture of cells: LCT and NCT.

In FIG. 7, $f_1$ is the frequency of a PCell that is a legacy carrier in both cell1 and cell2, while $f_{2N}$ is the is the frequency of an SCell that is an NCT, and $f_{2L}$ is the is the frequency of the Scell in cell number 2 that is a LCT. BS1 may be the network node 111 and BS2 may be the second network node 112.

When a UE 120 moves from a NCT to a LCT, the measurement that is based on ESS must be done based on CRS. This means that instead of measurements based on ESS every 5 ms, the UE 120 may use CRS symbols that are sent every 1 ms and on two antenna ports carrying CRS.

This becomes particularly a problem in a handover situation.

In another embodiment the serving eNB such as the network node 111 informs the UE 120 the type of carrier that the UE 120 is performing measurement on, by use of specific signaling. One such case may be for example a heterogeneous network and when small cells are coordinated with the macro cell. In this case macro eNB may inform the UEs that the pico eNBs in the area are all running NCT, so the UEs may perform measurements specific to NCT.

Signaling to Other Network Nodes

The network node 111 may also transmit the generated RS indicator or associated information to other network nodes e.g. to neighboring network nodes such as the second network node 112, positioning nodes, O&M, OSS, SON nodes etc. The network node 111 may send the above information to the other node proactively, periodically or in response to a request received from the other node.

The receiving network node may use this information to generate or update the information related to the RS configuration of cells on one or more carriers. The receiving network node may also use this to further signal this information to its own UEs, e.g. UEs that it serves.

UE 120 Capability Signaling Associated with Measurements on Carrier with Mixed RS Configuration This relates to Action 501 and 601 above. All UEs may not be capable of performing measurements in cells on carrier which contain cells with different configurations i.e. cells with first and second configurations. Therefore according to some embodiments the UE 120 may report its capability to the network node 111 e.g. eNode B, BS, relay node, core network node, positioning node etc., indicating that it is capable of performing radio measurements in cells on a carrier which contains mixture of cells operating using first such as e.g. NCT and second such as e.g. LCT signal configurations. The UE 120 may also signal additional information as part of the capability. The additional information may comprise of any one or more of the following:

Whether the UE 120 is capable of performing certain specific radio measurements such as e.g. RSRP and RSRQ, in cells on a carrier which contains mixture of cells operating using NCT and LCT configurations.

Whether the UE 120 is capable of autonomously determining RS configuration of cells on a carrier which contains mixture of cells operating using NCT and LCT configurations.

Whether the UE 120 is capable of performing radio measurements (e.g. RSRP and RSRQ) in cells on specific carrier which contains mixture of cells operating using NCT and LCT configurations. For example the specific carrier may be any one or more of the serving carrier, inter-frequency carrier and inter-RAT carrier such as e.g. measuring LTE carrier when serving cell is non-LTE.

The UE 120 may send the above mentioned capability information to the network node 111 in any of the following manner:
- Proactive reporting without receiving any explicit request from the network node e.g. serving or any target network node.
- Reporting upon receiving any explicit request from the network node 111 e.g. serving or any target network node.
- The explicit request may be sent to the UE 120 by the network anytime or at any specific occasion. For example the request for the capability reporting may be sent to the UE 120 during initial setup or after a cell change e.g. handover, RRC connection re-establishment, RRC connection release with redirection, PCell change in CA, PCC change in PCC etc.

The network node 111 such as e.g. a serving eNB, BS, positioning node, relay, RNC, BSC etc., may use the received UE 120 capability information for performing one or more radio operational tasks related to measurement configuration etc. In general the network node 111 may adapt the parameters sent in the measurement configuration to the UE 120 e.g. type and contents of RS configuration indicator. For example if the UE 120 does not support this capability then the network node 111 does not configure the UE 120 to perform measurement on a carrier which contains mixture of cells i.e. with both NCT and LCT. Depending upon the capability information received at the network node 111, the network may also configure UE 120 to perform specific measurements such as e.g. RSRP, RSRQ and/or specific type of carrier e.g. intra-frequency/serving carrier frequency and/or inter-frequency.

The network node 111 may also forward the received UE 120 capability information to another network node e.g. to a neighbouring radio network node, SON etc. This will avoid the need for the UE 120 to again signal its capability to a new serving radio node after the cell change e.g. after handover. In this way signalling overheads may be reduced.

Figure 8:
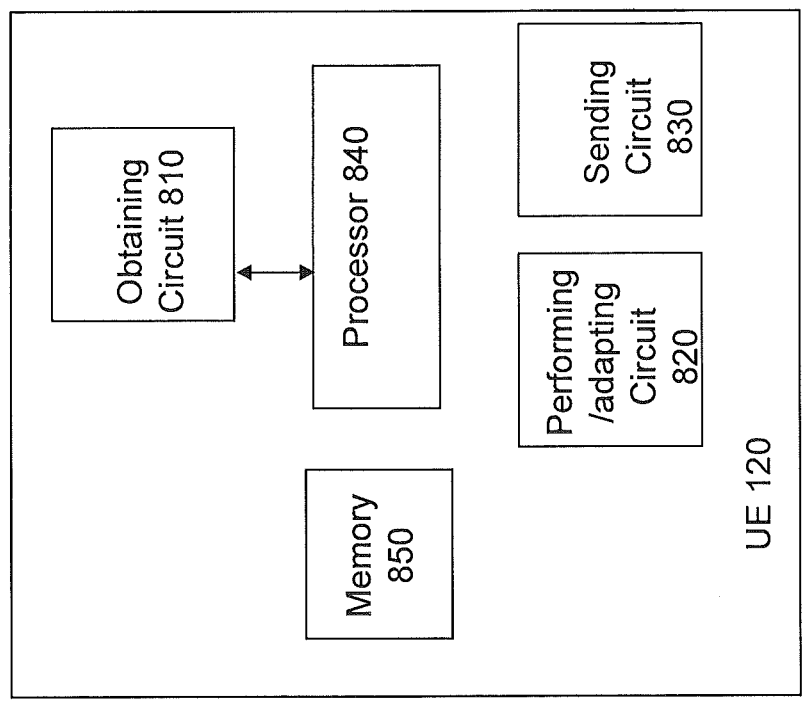
FIG. 8 is a block diagram illustrating elements of a UE according to some embodiments.

To perform the method actions for adapting a radio procedure described above in relation to FIG. 5, the UE 120 may comprise the following arrangement depicted in FIG. 8.

The UE 120 comprises means such as e.g. obtaining means configured to obtain information about signal configurations. The obtaining means may be an obtaining circuit 810 such as processor or in some embodiments a wireless receiver of the UE 120. The information indicates:
- whether or not a Downlink, DL, Reference Signal, RS, transmitted in cells on a first carrier frequency of a first carrier use the same one of a first and a second signal configuration, or
- whether or not the DL RS transmitted in the cells on the first carrier frequency use the same one of the first and the second signal configuration as that used for DL RS transmitted in a serving cell of the UE 120 on the first carrier frequency.

The first signal configuration comprises the DL RS not being transmitted in every subframe. The second signal configuration comprises the DL RS being transmitted in every subframe and also in every resource block over an entire channel bandwidth of a neighbour cell.

In some embodiments the means such as e.g. the obtaining means are further configured to obtain information about signal configurations by obtaining information indicating whether or not cells on a second carrier frequency of a second carrier operate using the same one of a first and a second signal configuration, wherein the second carrier frequency is a non-serving carrier frequency for the UE 120.

The means such as e.g. the obtaining means may further be configured to obtain information about signal configurations by autonomously determining whether a signal configuration of cells on the same carrier is the first or the second signal configuration, based on radio measurements.

In some embodiments, the means such as e.g. the obtaining means are further configured to obtain information about signal configurations based on one or more pre-defined rules out of:
- assuming that all cells on the first or the second carrier operate using first signal configuration if the information about signal configurations is not signaled to the UE 120 for that carrier,
- assuming that all neighbor cells on the first or the second carrier operate using the same signal configuration out of the first and the second signal configuration as that used in a cell serving the UE 120 if the information about signal configurations is not signaled to the UE 120 for that carrier,
- assuming that cells on one or more second carriers use the same signal configuration out of the first and the second signal configuration, as that of a reference carrier if the information about signal configurations is not signaled to the UE 120 for one or more second carriers but it is signaled to the UE 120 for the reference carrier.

The reference carrier may be a carrier whose at least one cell uses the first signal configuration.

In some embodiments, the means such as e.g. the obtaining means are further configured to obtain information about signal configurations by receiving it from a node. In these embodiments the means may be a wireless receiver of the UE 120. The node may be any one out of: another UE and a network node 111 serving the UE 120, and wherein the received information comprises one or more out of:
- whether all cells on the same carrier use the same or different signal configuration,
- whether serving and neighboring cells on the same carrier use the same or different signal configuration,
- whether the reference cell and neighboring cells on the same carrier use the same or different signal configuration, wherein the reference cell and neighbor cells are used by the UE 120 for at least positioning measurement,
- whether cells on the first and the second carrier use the same or different signal configuration, where the first and the second carrier are both serving carriers, and
- whether cells on the first and the second carrier use the same or different signal configuration, where the first and the second carrier are a serving carrier of the UE 120 and a non-serving carrier of the UE 120 respectively.

The means may further comprise adapting means configured to adapt a radio procedure based on the obtained information. The adapting means may be an adapting circuit 820, such as a processor or a memory 850 for storing information The radio procedure may be any one or more out of:
- a measurement procedure,
- a procedure of signaling obtained information about signal configurations to other nodes,
- a procedure of logging obtained information about signal configurations for Minimization of Drive Test, MDT, operation.

In some embodiments, the radio procedure may be a measurement procedure, and wherein the one or more processors further are configured to adapt the radio procedure based on the obtained information by adapting a measurement sampling or an instance when the UE 120 shall obtain samples for one or more types of radio measurements, and wherein the measurement is any one out of: intra-frequency, inter-frequency and inter-Radio Access Technology, RAT measurements.

In some embodiments, the means may further comprise sending means configured to send a message to a network node 111. The sending means may be a sending circuit 830 such as a wireless transmitter of the UE 120. The message comprises information about the capability of the UE 120, indicating that the UE 120 is capable of performing radio measurements on a carrier which comprises a mixture of cells operating using the first and the second signal configuration.

The information about the capability of the UE 120 may further comprise additional information comprising any one or more out of:
  whether the UE 120 is capable of autonomously determining RS configuration of cells on a carrier which comprises a mixture of cells operating using the first and the second signal configurations,
  whether the UE 120 is capable of performing radio measurements in cells on a specific carrier which comprises a mixture of cells operating using the first and the second signal configuration, which specific carrier is any one or more out of a serving carrier, an inter-frequency carrier and an inter-Radio Access Technology, RAT, carrier.

Figure 9:
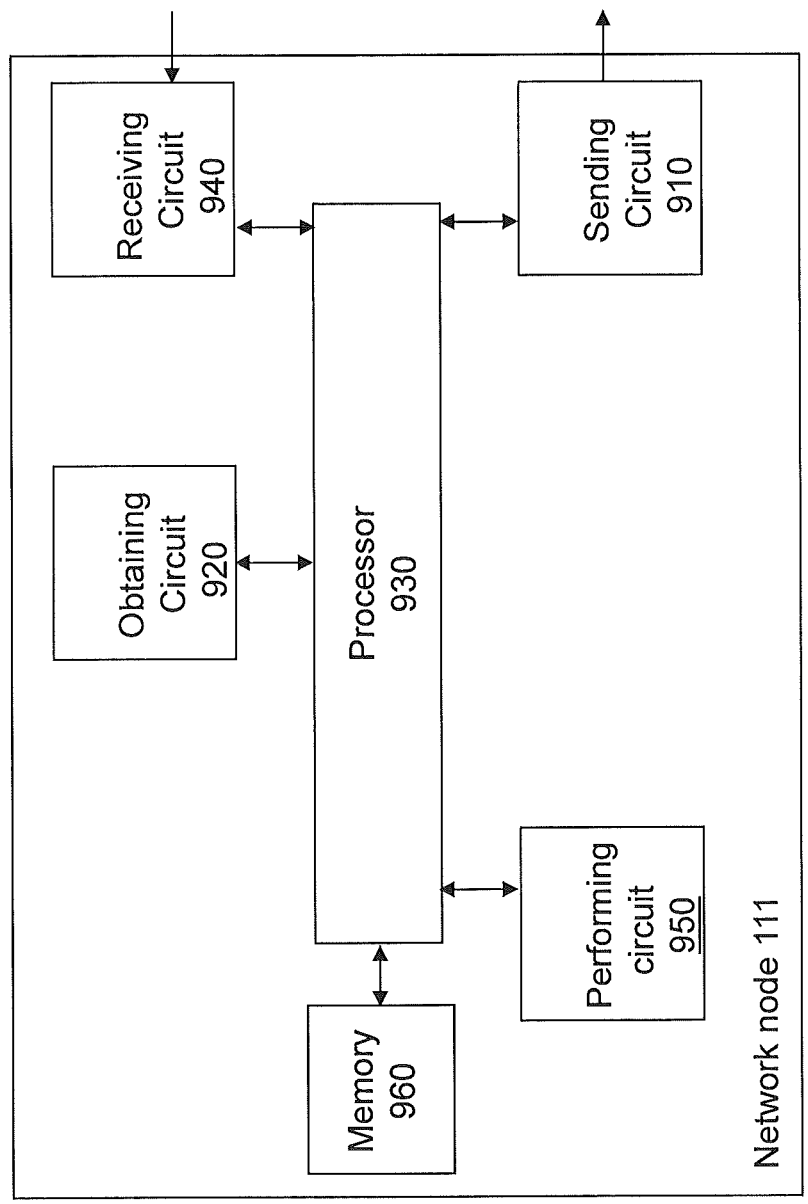
FIG. 9 is a block diagram illustrating elements of a network node according to some embodiments.

To perform the method actions for assisting a UE 120 in adapting a radio procedure described above in relation to FIG. 6, the network node 111 may comprise the following arrangement depicted in FIG. 9. The network node 111 is capable of serving the UE 120.

The network node 111 comprises means such as e.g. sending means configured to send information about signal configurations to the UE 120. The sending means may be a sending circuit 910 such as a wireless transmitter of the network node 111. The information indicates:
  whether or not a Downlink, DL, Reference Signal, RS, transmitted in cells on a first carrier frequency of a first carrier use the same one of a first and a second signal configuration, or
  whether or not the DL RS transmitted in cells on the first carrier frequency use the same one of the first and the second signal configuration as that used for DL RS transmitted in a serving cell of the UE 120 on the first carrier frequency,
  wherein the first signal configuration comprises the DL RS not being transmitted in at least every subframe, and
  wherein the second signal configuration comprises the DL RS being transmitted in every subframe and also in every resource block over an entire channel bandwidth of a neighbour cell.

The means such as e.g. sending means may further be configured to send the information about signal configurations to the UE 120 further comprising:
  whether all cells on the same carrier use the same or different signal configuration,
  whether serving and neighboring cells on the same carrier use the same or different signal configuration,
  whether reference and neighboring cells on the same carrier use the same or different signal configuration, wherein reference cell and neighbor cells are used by the UE 120 for at least positioning measurement,
  whether cells on the first carrier frequency and a second carrier frequency of a second cell use the same or different signal configuration, where the first and the second carrier are both serving carriers,
  whether cells on the first and the second carrier use the same or different signal configuration, where the first and the second carrier are serving carrier and non-serving carrier respectively.

The means may further comprise obtaining means configured to obtain information whether the DL RS transmitted on the first carrier frequency in the serving cell of the UE 120 and in at least one neighbour cell of the UE 120, use the first signal configuration or use the second signal configuration, or do not use the same signal configuration. The obtaining means may be an obtaining circuit 920 such as processor or in some embodiments a wireless receiver of the network node 111.

The information about signal configurations to be sent to the UE 120 may be based on the obtained information.

In some embodiments the information is to be obtained from another node, from the UE 120, or from another UE. In these embodiments, the obtaining means may be an obtaining circuit 920 such as a wireless receiver of the network node 111.

The obtained information may further comprises any one or more out of:
  a DL RS bandwidth of a cell operating using first signal configuration,
  a carrier frequency of the first or the second carrier on which a cell operates,
  a cell type and/or power class of a network node serving the cell on the first or the second carrier,
  location of a cell, e.g. geographical coordinates of each cell, coverage area of group of cells,
  an indication whether all cells on the same carrier frequency operate using the first or the second signal configuration or some operate using the first signal configuration and remaining ones using the second signal configuration.

The information to be obtained may comprises information for several neighboring cells of the network node 111.

The means may further comprise generating means configured to generate an indicator based on the obtained information. The generating means may be a processor 930. The information about signal configurations sent 604 to the UE 120 may be indicated by the indicator.

The means may further comprise receiving means configured to receive a message from the UE 120, which message comprises information about the capability of the UE 120, indicating that the UE 120 is capable of performing radio measurements on a carrier which comprises a mixture of cells operating using first and second signal configurations. The receiving means may be an receiving circuit 940 such a wireless receiver of the network node 111.

The information about the capability of the UE 120 may further comprise additional information comprising any one or more out of:
  whether the UE 120 is capable of autonomously determining RS configuration of cells on a carrier which comprises a mixture of cells operating using first and second signal configurations,
  whether the UE 120 is capable of performing radio measurements in cells on a specific carrier which comprises a mixture of cells operating using first and second signal configurations, which specific carrier is any one or more out of a serving carrier, an inter-frequency carrier and an inter-Radio Access Technology, RAT, carrier.

The means may further comprise performing means configured to perform one or more radio operational tasks using the information about the capability of the UE 120. The performing means may be a performing circuit 950 such a processor of the network node 111.

The embodiments herein may be implemented through one or more processors, such as the processor 930 in the network node 111 depicted in FIG. 9, and the processor 840 in the UE 120 depicted in FIG. 8, together with computer program code for performing the functions and actions of the embodiments herein. The program code mentioned above may also be provided as a computer program product, for instance in the form of a data carrier carrying computer program code for performing the embodiments herein when being loaded into the in the network node 111 or the UE 120. One such carrier may be in the form of a CD ROM disc. It is however feasible with other data carriers such as a memory stick. The computer program code may furthermore be provided as pure program code on a server and downloaded to the network node 111 or the UE 120.

The network node 111 may further comprise a memory 960 comprising one or more memory units and the UE 120 may further comprise the memory 850 comprising one or more memory units. The memories 850, 960 are arranged to be used to store obtained information, store data, configurations, schedulings, and applications etc. to perform the methods herein when being executed in the network node 111 or the UE 120.

Those skilled in the art will also appreciate that the obtaining circuit, receiving circuit sending circuit and performing circuit described above may refer to a combination of analog and digital circuits, and/or one or more processors configured with software and/or firmware, e.g. stored in the memories 850, 960, that when executed by the one or more processors such as the processors in the network node 111 and UE 120 perform as described above. One or more of these processors, as well as the other digital hardware, may be included in a single application-specific integrated circuitry (ASIC), or several processors and various digital hardware may be distributed among several separate components, whether individually packaged or assembled into a system-on-a-chip (SoC).

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appending claims.

Embodiments herein may be referred to as follows below:
eNB transmits an indicator to a UE to indicate whether:
all cells on a new carrier type (NCT) operate using NCT reference signal (RS) configuration or
some cells operate NCT RS configuration whereas some operate using CRS configuration according to legacy carrier type (LCT).

The UE upon receiving the above indication uses it to adapt one or more measurement procedure for measuring cells operating on NCT e.g. adapts measurement sampling by using specific subframes.

More specifically the followings are network node and UE related embodiments:

A method in a network node such as the network node 111 serving a UE such as the UE 120 comprises the actions of:
Obtaining information whether a downlink reference signal (DL RS) transmitted in a serving cell and in at least one neighbor cell of the UE on a first carrier frequency use a first signal configuration (aka new carrier type (NCT)) or use a second signal configuration (aka legacy carrier type (LCT)), or don't use the same signal configuration,
wherein the first signal configuration comprises the DL RS not transmitted in at least every subframe, and
wherein the second signal configuration comprises the DL RS transmission in every subframe and also in every resource block over the entire channel bandwidth of the neighbour cell.

This action is optional and may be performed by an obtaining circuit within the network node such as the network node 111.

Sending an indication informing the UE whether the DL RS transmitted on all cells on the first carrier frequency use the same one of the first and second signal configurations or not, or Sending an indication informing the UE whether the DL RS transmitted on all the neighbouring cells of the UE on the first carrier frequency use the same one of the first and second signal configurations as that used for DL RS transmitted on the serving cell on the first carrier frequency or not. This action 202 may be performed by a sending circuit within the network node such as the network node 111.

The network node 111 may comprise an interface unit to facilitate communications between the network node 111 and other nodes or devices, e.g., UEs. The interface may, for example, include a transceiver configured to transmit and receive radio signals over an air interface in accordance with a suitable standard.

According to some embodiments herein a method in a network node such as the network node 111 serving a UE such as the UE 120 is provided. The network node is comprised in a wireless communications network 100. The method may comprise the actions of:
sending an indicator to the UE to indicate whether:
all cells on a new carrier type (NCT) operate using NCT reference signal (RS) configuration or
some cells operate NCT RS configuration whereas some operate using CRS configuration according to legacy carrier type (LCT).

A method in a UE such as the UE 120 served by a network node such as the network node 111 comprises the actions of:
Obtaining information indicating whether the DL RS transmitted on all cells on a first carrier frequency use the same one of the first and second signal configurations or not or indicating whether the DL RS transmitted on all the neighboring cells of the UE on the first carrier frequency use the same one of the first and second signal configurations as that used for DL RS transmitted on the serving cell on the first carrier frequency, and wherein the first signal configuration comprises of the DL RS not transmitted in at least every subframe and the second signal configuration comprises of the DL RS transmitted in every subframe and also in every resource block over the entire channel bandwidth of the neighbor cell. This action may be performed by an obtaining circuit within the UE such as the UE 120.

Performing a radio procedure that uses at least DL RS transmitted on at least one neighbouring cell on the first carrier frequency, for example adapting DL RS measurement sampling rate or instance etc. This action may be performed by a performing circuit or adapting circuit within the UE such as the UE 120.

The UE 120 may comprise an interface unit to facilitate communications between the UE 120 and other nodes or devices, e.g., the network node 111. The interface may, for example, include a transceiver configured to transmit and receive radio signals over an air interface in accordance with a suitable standard.

According to embodiments herein a method in a UE such as the UE 120 served by a network node such as the network node 11 is provided. The UE and the network node are comprised in a wireless communications network 100. The method may comprise the actions of:

receiving 701 an indicator from the network node indicating whether:
- all cells on a new carrier type (NCT) operate using NCT reference signal (RS) configuration or
- some cells operate NCT RS configuration whereas some operate using CRS configuration according to legacy carrier type (LCT)

adapting 702 one or more measurement procedures for measuring cells operating on NCT based on the received indicator. E.g. adapting measurement sampling by using specific subframes.

ABBREVIATIONS

BS Base Station
BW Bandwidth
CID Cell Identity
CRS Cell-specific Reference Signal
DL Downlink
ESS Enhanced Synchronization Signal
ID Identity
LTE Long Term Evolution
MDT Minimization of drive test
OFDM Orthogonal Frequency Division Multiplexing
PBCH Physical Broadcast Channel
PCFICH Physical Control format Indicator
PDCCH Physical Downlink Control Channel
PDSCH Physical Downlink Shared Channel
PHICH Physical Hybrid ARQ Indicator Channel
PSS Primary Synchronization Signal
RAT Radio Access Technology
RE Resource Element
RB Resource Block
RRM Radio Resource Management
RSRQ Reference signal received quality
RSRP Reference signal received power
SFN Single Frequency Network
SSS Secondary Synchronization Signal
UE User Equipment
UL Uplink
SON Self Organizing Network
RSSI Received signal strength indicator
OTDOA Observed time difference of arrival

The invention claimed is:

1. A method in a User Equipment, UE, for adapting a radio procedure, the method comprising:
    obtaining information about signal configurations, which information indicates,
        whether or not Downlink, DL, Reference Signals, RS, transmitted in neighbor cells on first carrier frequency use the same one of a first signal configuration and a second signal configuration as that used for DL RS transmitted in a serving cell of the UE on the first carrier frequency,
        wherein the first signal configuration comprises the DL RS not being transmitted in every subframe, and
        wherein the second signal configuration comprises the DL RS being transmitted in every subframe and also in every resource block over an entire channel bandwidth of a neighbour cell; and
    adapting a radio procedure based on the obtained information, wherein the radio procedure in adapting the radio procedure based on the obtained information, comprises any one or more out of:
        a measurement procedure,
        a procedure of signaling obtained information about signal configurations to other nodes,
        a procedure of logging obtained information about signal configurations for Minimization of Drive Test, MDT, operation.

2. The method according to claim 1,
    wherein obtaining information about signal configurations further comprises obtaining information indicating whether or not cells on a second carrier frequency of a second carrier operate using the same one of the first signal configuration and the second signal configuration,
    wherein the second carrier frequency is a non-serving carrier frequency for the UE.

3. The method according claim 1,
    wherein obtaining information about signal configurations is performed by autonomously determining whether a signal configuration of cells on the same carrier is the first or the second signal configuration, based on radio measurements.

4. The method according to claim 2,
    wherein obtaining information about signal configurations is based on one or more pre-defined rules out of:
    determining that all cells on the first or the second carrier operate using the first signal configuration if the information about signal configurations is not signaled to the UE for that carrier,
    determining that all neighbor cells on the first or the second carrier operate using the same signal configuration out of the first and the second signal configuration as that used in a cell serving the UE if the information about signal configurations is not signaled to the UE for that carrier,
    determining that cells on one or more second carriers use the same signal configuration out of the first and the second signal configuration, as that of a reference carrier if the information about signal configurations is not signaled to the UE for one or more second carriers but it is signaled to the UE for the reference carrier.

5. The method according to claim 4, wherein the reference carrier is a carrier whose at least one cell uses the first signal configuration.

6. The method according to claim 2,
    wherein obtaining information about signal configurations is performed by receiving it from a node, which node is any one out of: another UE or a network node serving the UE, and
    wherein the received information comprises an indication of one or more out of:
    whether all cells on the same carrier use the same or different signal configuration,
    whether serving and neighboring cells on the same carrier use the same or different signal configuration,
    whether the reference cell whose signal configuration is known to the UE and neighboring cells on the same carrier use the same or different signal configuration, wherein the reference cell and neighbor cells are used by the UE for at least positioning measurement,
    whether cells on the first and the second carrier use the same or different signal configuration, where the first and the second carrier are both serving carriers, which are serving the UE, and
    whether cells on the first and the second carrier use the same or different signal configuration, where the first and the second carrier are a serving carrier of the UE and a non-serving carrier of the UE respectively.

7. The method according to claim 1,
wherein the radio procedure in adapting the radio procedure based on the obtained information, comprises a measurement procedure.

8. The method according to claim 1,
wherein the radio procedure is a measurement procedure, and wherein adapting the radio procedure based on the obtained information, is performed by adapting a measurement sampling or an instance when the UE shall obtain samples for one or more types of radio measurements, and
wherein the measurement is any one out of: intra-frequency, inter-frequency and inter-Radio Access Technology, RAT measurements.

9. The method according to claim 1, further comprising:
sending a message to a network node, which message comprises information about the capability of the UE, indicating that the UE is capable of performing radio measurements on a carrier which comprises a mixture of cells operating using the first and the second signal configuration.

10. The method according to claim 9,
wherein the information about the capability of the UE further comprises additional information comprising any one or more out of:
whether the UE is capable of autonomously determining RS configuration of cells on a carrier which comprises a mixture of cells operating using the first and the second signal configurations,
whether the UE is capable of performing radio measurements in cells on a specific carrier which comprises a mixture of cells operating using the first and the second signal configuration, which specific carrier is any one or more out of a serving carrier, an inter-frequency carrier and an inter-Radio Access Technology, RAT, carrier.

11. The method of claim 1 wherein the Downlink Reference Signals comprise Common Reference Signal type Downlink Reference Signals, wherein the first signal configuration comprises the Common Reference Signal type Downlink Reference Signals not being transmitted in every subframe, and wherein the second configuration comprises the Common Reference Signal type Downlink Reference Signals being transmitted in every subframe and also in every resource block over an entire channel bandwidth of the neighbour cell.

12. The method of claim 11 wherein obtaining information comprises obtaining information that indicates,
that the Common Reference Signal type Downlink Reference Signals transmitted in the neighbor cells on the first carrier frequency do not use the same one of the first signal configuration and the second signal configuration as that used for the Common Reference Signal type Downlink Reference Signals transmitted in the service cell of the UE on the first carrier frequency.

13. A method in a network node for assisting a User Equipment, UE, in adapting a radio procedure, which network node serves the UE, the method comprising:
sending information about signal configurations to the UE
wherein the information indicates,
whether or not Downlink, DL, Reference Signals, RS, transmitted in neighbor cells on the first carrier frequency use the same one of a first signal configuration and a second signal configuration as that used for DL RS transmitted in a serving cell of the UE on the first carrier frequency,
wherein the first signal configuration comprises the DL RS not being transmitted in every subframe, and
wherein the second signal configuration comprises the DL RS being transmitted in every subframe and also in every resource block over an entire channel bandwidth of a neighbour cell; and
receiving a message from the UE, which message comprises information about the capability of the UE, indicating that the UE is capable of performing radio measurements on a carrier which comprises a mixture of cells operating using the first and second signal configurations.

14. The method according to claim 13, wherein sending information about signal configurations to the UE further comprises indicating:
whether all cells on the same carrier use the same or different signal configuration,
whether serving and neighboring cells on the same carrier use the same or different signal configuration,
whether reference and neighboring cells on the same carrier use the same or different signal configuration, wherein reference cell and neighbor cells are used by the UE for at least positioning measurement,
whether cells on the first carrier frequency and a second carrier frequency of a second cell use the same or different signal configuration, where the first and the second carrier are both serving carriers, or
whether cells on the first and the second carrier use the same or different signal configuration, where the first and the second carrier are serving carrier and non-serving carrier respectively.

15. The method according to claim 13, further comprising:
obtaining information whether the DL RS transmitted on the first carrier frequency in the serving cell of the UE and in at least one neighbour cell of the UE, use the first signal configuration or use the second signal configuration, or do not use the same signal configuration, and
wherein the information about signal configurations sent to the UE is based on the obtained information.

16. The method according to claim 15, wherein the information is obtained from another node, from the UE, or from another UE.

17. The method according to claim 15, wherein the obtained information further comprises any one or more out of:
a DL RS bandwidth of a cell operating using first signal configuration,
a carrier frequency of the first or the second carrier on which a cell operates,
a cell type and/or power class of a network node serving the cell on the first or the second carrier,
location of a cell,
an indication whether all cells on the same carrier frequency operate using the first or the second signal configuration or some operate using the first signal configuration and remaining ones using the second signal configuration.

18. The method according to claim 13,
wherein the obtained information comprises information for several neighboring cells of the network node.

19. The method according to claim 13, further comprising:
generating an indicator based on the obtained information, and
wherein the information about signal configurations sent to the UE is indicated by the indicator.

20. The method according to claim 13, further comprising:
wherein the information about the capability of the UE further comprises additional information comprising any one or more out of:

whether the UE is capable of autonomously determining RS configuration of cells on a carrier which comprises a mixture of cells operating using first and second signal configurations, whether the UE is capable of performing radio measurements in cells on a specific carrier which comprises a mixture of cells operating using first and second signal configurations, which specific carrier is any one or more out of a serving carrier, an inter-frequency carrier and an inter-Radio Access Technology, RAT, carrier.

21. The method according to claim 13, further comprising:
performing one or more radio operational tasks using the information about the capability of the UE.

22. The method of claim 13 wherein the Downlink Reference Signals comprise Common Reference Signal type Downlink Reference Signals, wherein the first signal configuration comprises the Common Reference Signal type Downlink Reference Signals not being transmitted in every subframe, and wherein the second configuration comprises the Common Reference Signal type Downlink Reference Signals being transmitted in every subframe and also in every resource block over an entire channel bandwidth of the neighbour cell.

23. The method of claim 22 wherein the information indicates,
that the Common Reference Signal type Downlink Reference Signals transmitted in the neighbour cells on the first carrier frequency do not use the same one of the first signal configuration and the second signal configuration as that used for the Common Reference Signal type Downlink Reference Signals transmitted in a serving cell of the UE on the first carrier frequency.

24. A User Equipment, UE, for adapting a radio procedure, the UE comprising:
means configured to obtain information about signal configurations, which information indicates,
whether or not Downlink, DL, Reference Signals, RS, transmitted in neighbor cells on the first carrier frequency use the same one of a first signal configuration and a second signal configuration as that used for DL RS transmitted in a serving cell of the UE on the first carrier frequency,
wherein the first signal configuration comprises the DL RS not being transmitted in every subframe, and
wherein the second signal configuration comprises the DL RS being transmitted in every subframe and also in every resource block over an entire channel bandwidth of a neighbour cell; and
means configured to adapt a radio procedure based on the obtained information, wherein the radio procedure comprises any one or more out of:
a measurement procedure,
a procedure of signaling obtained information about signal configurations to other nodes,
a procedure of logging obtained information about signal configurations for
Minimization of Drive Test, MDT, operation.

25. The UE according to claim 24,
wherein the means further are configured to obtain information about signal configurations by obtaining information indicating whether or not cells on a second carrier frequency of a second carrier operate using the same one of the first signal configuration and the second signal configuration,
wherein the second carrier frequency is a non-serving carrier frequency for the UE.

26. The UE according claim 24,
wherein the means further are configured to obtain information about signal configurations by autonomously determining whether a signal configuration of cells on the same carrier is the first or the second signal configuration, based on radio measurements.

27. The UE according to claim 25,
wherein the means further are configured to obtain information about signal configurations based on one or more pre-defined rules out of:
determining that all cells on the first or the second carrier operate using the first signal configuration if the information about signal configurations is not signaled to the UE for that carrier,
determining that all neighbor cells on the first or the second carrier operate using the same signal configuration out of the first and the second signal configuration as that used in a cell serving the UE if the information about signal configurations is not signaled to the UE for that carrier,
determining that cells on one or more second carriers use the same signal configuration out of the first and the second signal configuration, as that of a reference carrier if the information about signal configurations is not signaled to the UE for one or more second carriers but it is signaled to the UE for the reference carrier.

28. The UE according to claim 27, wherein the reference carrier is a carrier whose at least one cell uses the first signal configuration.

29. The UE according to claim 25,
wherein the means further are configured to obtain information about signal configurations by receiving it from a node, which node is any one out of: another UE and a network node serving the UE, and
wherein the received information comprises one or more out of:
whether all cells on the same carrier use the same or different signal configuration,
whether serving and neighboring cells on the same carrier use the same or different signal configuration,
whether the reference cell whose signal configuration is known to the UE and neighboring cells on the same carrier use the same or different signal configuration, wherein the reference cell and neighbor cells are used by the UE for at least positioning measurement,
whether cells on the first and the second carrier use the same or different signal configuration, where the first and the second carrier are both serving carriers which are serving the UE, and
whether cells on the first and the second carrier use the same or different signal configuration, where the first and the second carrier are a serving carrier of the UE and a non-serving carrier of the UE respectively.

30. The UE according to claim 24, wherein the radio procedure comprises
a measurement procedure.

31. The UE according to claim 24,
wherein the radio procedure is a measurement procedure, and wherein the means further are configured to adapt the radio procedure based on the obtained information by adapting a measurement sampling or an instance when the UE shall obtain samples for one or more types of radio measurements, and
wherein the measurement is any one out of intra-frequency, inter-frequency and inter-Radio Access Technology, RAT measurements.

32. The UE according to claim 24, further comprising:
means configured to send a message to a network node, which message comprises information about the capability of the UE, indicating that the UE is capable of performing radio measurements on a carrier which comprises a mixture of cells operating using the first and the second signal configuration.

33. The UE according to claim 32, further comprising:
wherein the information about the capability of the UE further comprises additional information comprising any one or more out of:
whether the UE is capable of autonomously determining RS configuration of cells on a carrier which comprises a mixture of cells operating using the first and the second signal configurations,
whether the UE is capable of performing radio measurements in cells on a specific carrier which comprises a mixture of cells operating using the first and the second signal configuration, which specific carrier is any one or more out of a serving carrier, an inter-frequency carrier and an inter-Radio Access Technology, RAT, carrier.

34. The UE of claim 24 wherein the Downlink Reference Signals comprise Common Reference Signal type Downlink Reference Signals, wherein the first signal configuration comprises the Common Reference Signal type Downlink Reference Signals not being transmitted in every subframe, and wherein the second configuration comprises the Common Reference Signal type Downlink Reference Signals being transmitted in every subframe and also in every resource block over an entire channel bandwidth of the neighbour cell.

35. A network node for assisting a User Equipment, UE, in adapting a radio procedure, which network node is capable of serving the UE, the network node comprising:
means configured to send information about signal configurations to the UE indicating,
whether or not Downlink, DL, Reference Signals, RS, transmitted in neighbor cells on the first carrier frequency use the same one of a first signal configuration and a second signal configuration as that used for DL RS transmitted in a serving cell of the UE on the first carrier frequency,
wherein the first signal configuration comprises the DL RS not being transmitted in every subframe, and
wherein the second signal configuration comprises the DL RS being transmitted in every subframe and also in every resource block over an entire channel bandwidth of a neighbour cell; and
means configured to receive a message from the UE, which message comprises information about the capability of the UE, indicating that the UE is capable of performing radio measurements on a carrier which comprises a mixture of cells operating using first and second signal configurations.

36. The network node according to claim 35, wherein the means further are configured to send the information about signal configurations to the UE further comprising:
whether all cells on the same carrier use the same or different signal configuration,
whether serving and neighboring cells on the same carrier use the same or different signal configuration,
whether reference and neighboring cells on the same carrier use the same or different signal configuration, wherein reference cell and neighbor cells are used by the UE for at least positioning measurement,
whether cells on the first carrier frequency and a second carrier frequency of a second cell use the same or different signal configuration, where the first and the second carrier are both serving carriers
whether cells on the first and the second carrier use the same or different signal configuration, where the first and the second carrier are serving carrier and non-serving carrier respectively.

37. The network node according to claim 35, wherein the means further is configured to:
obtain information whether the DL RS transmitted on the first carrier frequency in the serving cell of the UE and in at least one neighbour cell of the UE, use the first signal configuration or use the second signal configuration, or do not use the same signal configuration, and
wherein the information about signal configurations to be sent to the UE is based on the obtained information.

38. The network node according to claim 37, wherein the information is to be obtained from another node, from the UE, or from another UE.

39. The network node according to claim 37, wherein the obtained information further comprises any one or more out of:
a DL RS bandwidth of a cell operating using first signal configuration,
a carrier frequency of the first or the second carrier on which a cell operates,
a cell type and/or power class of a network node serving the cell on the first or the second carrier,
location of a cell,
an indication whether all cells on the same carrier frequency operate using the first or the second signal configuration or some operate using the first signal configuration and remaining ones using the second signal configuration.

40. The network node according to claim 35, wherein the information to be obtained comprises information for several neighboring cells of the network node.

41. The network node according to claim 35, wherein the means further are configured to:
generate an indicator based on the obtained information, and
wherein the information about signal configurations sent to the UE is to be indicated by the indicator.

42. The network node according to claim 35, wherein the information about the capability of the UE further comprises additional information comprising any one or more out of:
whether the UE is capable of autonomously determining RS configuration of cells on a carrier which comprises a mixture of cells operating using first and second signal configurations,
whether the UE is capable of performing radio measurements in cells on a specific carrier which comprises a mixture of cells operating using first and second signal configurations, which specific carrier is any one or more out of a serving carrier, an inter-frequency carrier and an inter-Radio Access Technology, RAT, carrier.

43. The network node according to claim 35, wherein the means further are configured to:
perform one or more radio operational tasks using the information about the capability of the UE.

44. The network node of claim 35 wherein the Downlink Reference Signals comprise Common Reference Signal type Downlink Reference Signals, wherein the first signal configuration comprises the Common Reference Signal type Downlink Reference Signals not being transmitted in every subframe, and wherein the second configuration comprises the Common Reference Signal type Reference Signals being transmitted in every subframe and also in every resource block over an entire channel bandwidth of the neighbour cell.

* * * * *